\n

(12) United States Patent
Furumura et al.

(10) Patent No.: US 8,237,622 B2
(45) Date of Patent: Aug. 7, 2012

(54) BASE SHEET

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech Inc., Tokyo (JP)

( * ) Notice: Subject to any disclaimer, the term of this patent is extended or adjusted under 35 U.S.C. 154(b) by 227 days.

(21) Appl. No.: 12/521,244

(22) PCT Filed: Dec. 14, 2007

(86) PCT No.: PCT/JP2007/074108
§ 371 (c)(1),
(2), (4) Date: Jan. 12, 2010

(87) PCT Pub. No.: WO2008/081699
PCT Pub. Date: Jul. 10, 2008

(65) Prior Publication Data
US 2011/0063184 A1    Mar. 17, 2011

(30) Foreign Application Priority Data

Dec. 28, 2006  (JP) ................................. 2006-354774
Jun. 12, 2007  (JP) ................................. 2007-155763

(51) Int. Cl.
*H01Q 1/36* (2006.01)
(52) U.S. Cl. ..................... 343/895; 343/795; 343/866
(58) Field of Classification Search .................. 343/741, 343/742, 795, 866, 867, 895
See application file for complete search history.

(56) References Cited

U.S. PATENT DOCUMENTS

| 3,946,206 A | 3/1976 | Darjany |
| 4,058,839 A | 11/1977 | Darjany |

(Continued)

FOREIGN PATENT DOCUMENTS

JP    61-006783    1/1986
(Continued)

OTHER PUBLICATIONS

International Preliminary Report on Patentability issued Jun. 3, 2009 for PCT/JP2007/072749 (English translation).

(Continued)

*Primary Examiner* — Tho G Phan
(74) *Attorney, Agent, or Firm* — Foley & Lardner LLP

(57) ABSTRACT

A base sheet 12 has a structure that stably couples a particular chip measuring 1 mm or less on paper with an antenna line by only disposing the chip and antenna line in such a manner that the chip and antenna line are close to each other, without electrically bringing the chip and antenna line into contact with each other. The base sheet 12 includes a chip 11 having a spiral coil 13 with at least one turn disposed on a surface of the chip, or inside the chip and near the surface thereof and an antenna line 14 having a conductor part 14A orbiting around the coil 13A of the chip 11 or directly over or directly below the coil 13A so that the conductor part is magnetically coupled with the coil 13A. This base sheet has a structure that stably couples even a chip measuring 1 mm or less on paper or the like with an antenna line by only disposing the chip and antenna line in such a manner that the chip and antenna line are close to each other, without physically bringing the chip and antenna line into contact with each other.

4 Claims, 35 Drawing Sheets

U.S. PATENT DOCUMENTS

| | | | | |
|---|---|---|---|---|
| 4,745,401 | A * | 5/1988 | Montean | 340/572.3 |
| 5,204,681 | A | 4/1993 | Greene | |
| 5,291,205 | A | 3/1994 | Greene | |
| 5,497,952 | A * | 3/1996 | Iding | 242/475.8 |
| 5,518,937 | A | 5/1996 | Furumura et al. | |
| 5,581,257 | A | 12/1996 | Greene et al. | |
| 5,808,587 | A | 9/1998 | Shima | |
| 6,072,394 | A | 6/2000 | Hasegawa et al. | |
| 6,285,284 | B1 | 9/2001 | Soe et al. | |
| 6,479,384 | B2 | 11/2002 | Komai et al. | |
| 6,642,827 | B1 | 11/2003 | McWilliams et al. | |
| 6,758,397 | B2 | 7/2004 | Catan | |
| 6,966,488 | B2 | 11/2005 | Yamagami | |
| 7,061,083 | B1 | 6/2006 | Usami et al. | |
| 7,158,033 | B2 | 1/2007 | Forster | |
| 7,227,504 | B2 * | 6/2007 | Deguchi et al. | 343/742 |
| 7,288,320 | B2 | 10/2007 | Steenblik et al. | |
| 7,317,420 | B2 | 1/2008 | Aisenbrey | |
| 7,405,665 | B2 | 7/2008 | Yamazaki | |
| 7,427,577 | B2 | 9/2008 | Tang et al. | |
| 7,508,305 | B2 | 3/2009 | Yamazaki et al. | |
| 7,623,036 | B2 | 11/2009 | Onderko et al. | |
| 7,876,189 | B2 | 1/2011 | Gilmartin et al. | |
| 7,893,837 | B2 | 2/2011 | Yamazaki et al. | |
| 7,984,849 | B2 | 7/2011 | Berghel et al. | |
| 2003/0037240 | A1 | 2/2003 | Yamagishi et al. | |
| 2003/0095032 | A1 | 5/2003 | Hoshino et al. | |
| 2003/0136828 | A1 | 7/2003 | Takesada et al. | |
| 2005/0194591 | A1 | 9/2005 | Usami et al. | |
| 2006/0044111 | A1 | 3/2006 | Kollar et al. | |
| 2006/0044769 | A1 * | 3/2006 | Forster et al. | 361/760 |
| 2006/0202269 | A1 | 9/2006 | Suzuki et al. | |
| 2007/0176622 | A1 | 8/2007 | Yamazaki | |
| 2007/0210364 | A1 | 9/2007 | Kato et al. | |
| 2008/0042168 | A1 | 2/2008 | Watanabe et al. | |
| 2008/0130018 | A1 | 6/2008 | Steenblik et al. | |
| 2008/0303735 | A1 | 12/2008 | Fujimoto et al. | |
| 2009/0206151 | A1 | 8/2009 | Morita | |
| 2010/0026441 | A1 | 2/2010 | Wedley | |
| 2010/0066619 | A1 | 3/2010 | Furumura et al. | |
| 2010/0067166 | A1 | 3/2010 | Furumura et al. | |
| 2011/0063184 | A1 | 3/2011 | Furumura et al. | |

FOREIGN PATENT DOCUMENTS

| | | |
|---|---|---|
| JP | 63-112198 | 5/1988 |
| JP | 63-261851 | 10/1988 |
| JP | 03-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-179005 | 6/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO 00/36555 | 6/2000 |
| WO | WO-2008/099955 | 8/2008 |

OTHER PUBLICATIONS

International Preliminary Report on Patentability issued Jun. 3, 2009 for PCT/JP2007/072750 (English translation).

International Preliminary Report on Patentability issued Jun. 3, 2009 for PCT/JP2007/072751 (English Translation).

International Preliminary Report on Patentability issued Jun. 3, 2009 for PCT/JP2007/072752 (English translation).

International Preliminary Report on Patentability issued Jun. 30, 2009 for PCT/JP2007/072746 (English Translation).

International Search Report mailed Feb. 19, 2008 for PCT/JP2007/072746 (English translation).

International Preliminary Report on Patentability issued Jul. 9, 2009 for PCT/JP2007/074108 (English translation).

Usami, Mitsuo, An ultrasmall RFID chip:m-chip, Oyo Buturi, vol. 73, No. 9, pp. 1179-1183 (2004).

Usami, Mitsuo, et al., Ubiquitous Technology IC Tag, first edition, Ohmsha, Ltd., pp. 115, Mar. 15, 2005.

Non-final Office Action for U.S. Appl. No. 12/516,500, mailed on Sep. 29, 2011, 15 pp.

Notice of Allowance for U.S. Appl. No. 12/516,493, mailed Oct. 17, 2011, 14 pp.

Non-Final Office Action for U.S. Appl. No. 12/516,497, mailed on Nov. 21, 2011, 10 pp.

"RFID 'Powder'—World's Smallest RFID Tag," Hitachi, Technology LLC, Feb. 14, 2007, http://www.technology.com/ct/Science-Fiction-News.asp?NewsNum=939, 3 pp. Printed from the Web on Jan. 4, 2012.

International Preliminary Report on Patentability for PCT/JP2007/072747, mailed Jun. 11, 2009 (English Translation) 6 pp.

International Preliminary Report on Patentability for PCT/JP2007/072748, mailed Jun. 11, 2009 (English Translation) 7 pp.

International Search Report and Written Opinion for PCT/JP2007/072747, mailed Jan. 29, 2008 (English Translation) 8 pp.

International Search Report and Written Opinion for PCT/JP2007/072748, mailed Feb. 19, 2008 (English Translation) 7 pp.

International Search Report and Written Opinion for PCT/JP2007/072749 mailed Feb. 19, 2008 (English Translation) 6 pp.

International Search Report and Written Opinion for PCT/JP2007/072750, mailed Feb. 26, 2008 (English Translation) 9 pp.

International Search Report and Written Opinion for PCT/JP2007/072751, mailed Feb. 5, 2008 (English Translation) 10 pp.

International Search Report and Written Opinion for PCT/JP2007/072752, mailed Feb. 12, 2008 (English Translation) 10 pp.

Junko Yoshida, "Euro bank notes to embed RFID chips by 2005," EETimes News and Analysis, Dec. 19, 2001, http://www.eetimes.com/story/OEG20011219S0016, 3 pp.

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.

N. Mura et al., "RF-Powder : Fabrication of 0.15-mm Si-powder Resonating at Microwave Frequencies," IEEE European Microwave Conference, 2007, vol. 9 , Issue 12, Oct. 2007, pp. 392-395.

Non-Final Office Action for U.S. Appl. No. 12/516,643, mailed on Jan. 12, 2012, 17 pp.

Non-final Office Action received for U.S. Appl. No. 12/516,500 dated Feb. 3, 2012, 13 pp.

Notice of Allowance for U.S. Appl. No. 12/516,493, mailed on Jan. 20, 2012, 5 pp.

Notice of Allowance received for U.S. Appl. No. 12/516,493 dated Feb. 23, 2012, 5 pp.
Restriction Requirement for U.S. Appl. No. 12/516,705, mailed on Dec. 12, 2011, 7 pp.
Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.
Tim Hornyak, "RFID Powder," Scientific American, Inc., Feb. 2008, pp. 68-71.
W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.
Winston Chai, "Euro notes to get RFID tags from Hitachi?," CBS Interactive Limited, May 23, 2003, http://networks.silicon.com/mobile/0,39024665,10004316,00.htm, 8 pp.
Non-final Office Action received for U.S. Appl. No. 12/516,705 dated Mar. 19, 2012.
Final Office Action issued for U.S. Appl. No. 12/516,497, mailed on Jun. 5, 2012, 15 pp.
Non-Final Office Action issued for U.S. Appl. No. 12/516,500, mailed on Jun. 14, 2012, 17 pp.

* cited by examiner

FUNCTION-ORIENTED IC TAG CHIP (A)

ULTRASMALL SIZE-ORIENTED IC TAG CHIP (B)

BASE SHEET

CROSS-REFERENCE TO RELATED APPLICATIONS

The present application is a U.S. national stage application claiming the benefit of International Application No. PCT/JP2007/074108, filed on Dec. 14, 2007, the entire contents of which is incorporated herein by reference in its entirety.

TECHNICAL FIELD

The present invention relates to a base sheet provided with a chip and an antenna. In particular, the invention relates to a technology for connecting, in a noncontact manner, to a chip including a circuit for storing information readable or identifiable on the basis of a signal wave transmitted from a reader/writer and to an antenna for receiving the signal wave transmitted from the reader/writer.

BACKGROUND ART

Currently, it is considered that a wireless IC tag or a wireless IC card (hereafter referred to as a "wireless IC tag/card") is a product in the entrance to ubiquitous era. For example, an RFID (radio frequency identification/radio frequency IC tag), which is a type of a wireless IC tag/card, is used for applications such as the identification of a name plate or a product and the management of parts, materials, intermediate products, finished products, or the like in a plant, such as the assortment thereof. Wireless IC tags/cards are also used in repeatedly usable, prepaid train cards (e.g., Suica cards issued by the East Japan Railway Company, etc.) and commutation cards, both of which operate only near readers/writers, electronic money, and the like.

Typically, these wireless IC tags/cards do not include a power supply such as a battery and receives and rectifies a readout signal wave transmitted from a reader/writer, and convert the resultant power into a direct-current power source for driving a control circuit or a memory. If such a wireless IC tag/card is used as an RFID, a high frequency such as a 900 MHz range or a 2.45 GHz range is used as a radio frequency to keep a readout distance of several tens centimeters to several meters. Also, the wireless IC tag/card includes an antenna for transmitting a radio wave or receiving a transmitted radio wave, such as a dipole antenna.

Figure 1A:
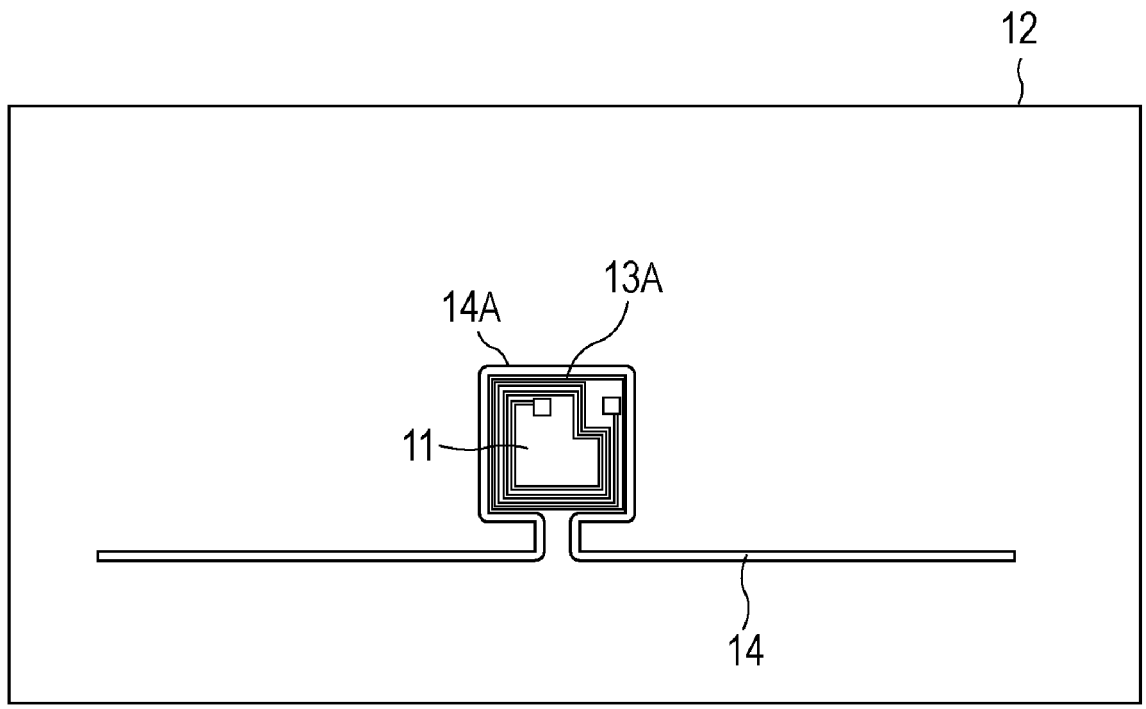
FIG. 1A shows a plan view of a substrate sheet according to the present invention and is a disposition plan view of an exaggerated wireless IC (RFID) chip and a dipole antenna magnetically coupled according to the present invention.

As a key to the reference numerals in the figures and specification the following are indicated:

Wireless IC chip—reference numerals 11, 93, 113, 123, 133, 143, 153, 163, and 174;
Base Sheet—reference numerals 12, 91, 111, 121, 131, 141, 151, 161, and 171;
Spiral coil on a wireless IC chip—reference numerals 13A and 33A;
Antenna—reference numerals 14, 92, 112, 122, 132, 152, 162, 172, and 173;
Antenna coupling part coil—reference numerals 14A, 92A, 112A, 152A, and 162A;
On-chip coil—reference numerals 93A, 113A, 123A, 133A, 153A, and 163A;
Coupling part of spiral antenna line—reference numeral 112A;
Loop antenna for reader/writer—reference numeral 124;
Reader/writer—reference numeral 125;
Antenna line—reference numeral 132;
Spiral part of antenna line—reference numeral 132A;
Meander antenna—reference numeral 142;
Meandering part (meander) of antenna—reference numeral 144;
Coupling part drawing line—reference numeral 162;
Sheet—reference numeral 164; and
Ink coat film—reference numeral 165.

SUMMARY

As such, a reader/writer uses an antenna for transmitting or receiving a readout signal wave. By increasing the gain of this antenna and using a radio wave transmitted in a specific direction, information stored in an RFID can be read out even from a distance of several tens of centimeters to several meters. For example, this allows assorting cargoes such as products.

Figure 18:
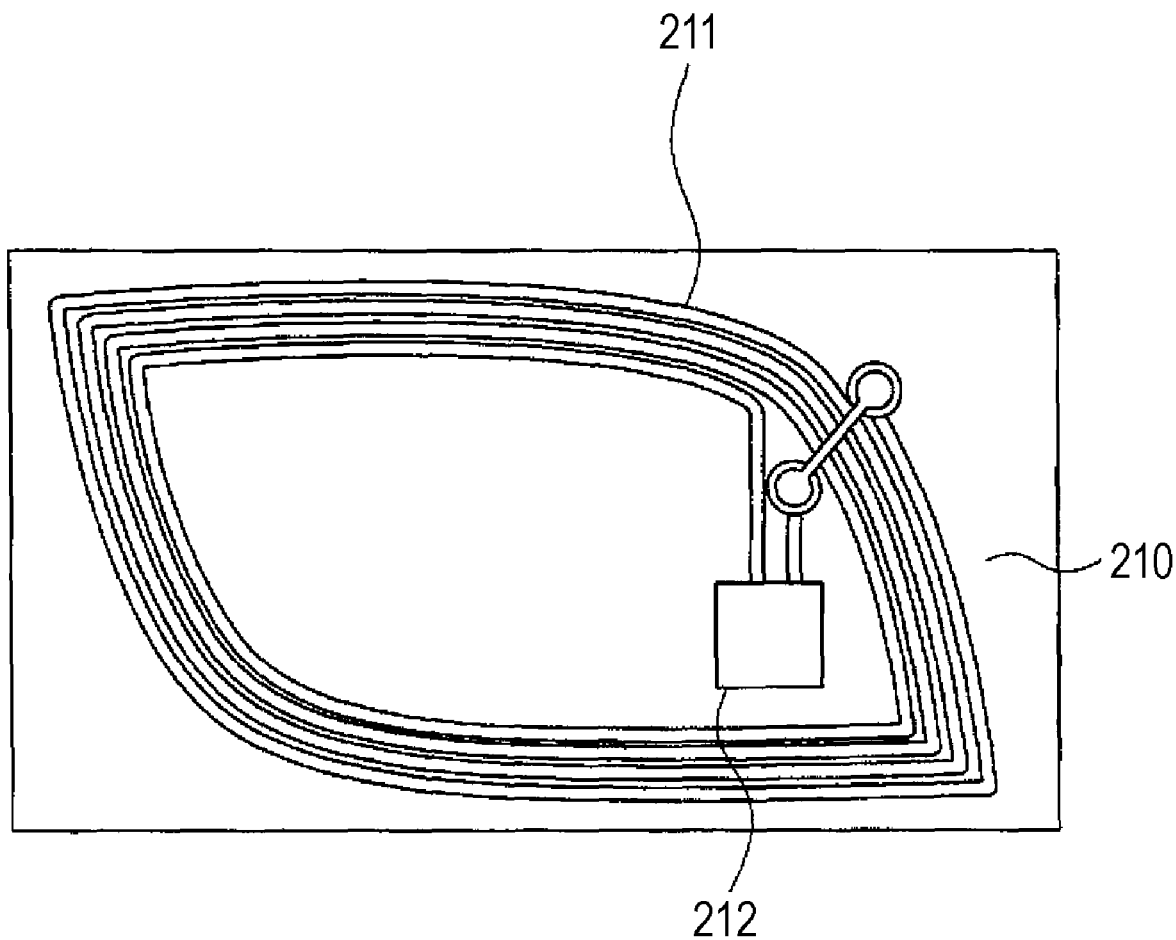
FIG. 18 is a front view showing a configuration of a related-art noncontact loop antenna-type IC card.

On the other hand, also for a purpose of avoiding interference among lanes using simple control, the above-mentioned prepaid ticket card uses a low frequency such as 13.56 MHz as a radio frequency so that a signal is exchanged only when bringing the card close to a ticket gate up to a distance of several centimeters therefrom. Also, the prepaid ticket card includes a spiral coil much smaller (several centimeters or so) than the wavelength of a radio frequency and a wireless IC coupled to the spiral coil. An example structure of such a ticket card is shown in FIG. 18. In FIG. 18, "210" represents a ticket card, "211" represents a spiral coil, and "212" represents a wireless IC. The spiral coil 211 allows a ticket card 210 and a reader/writer coil included in a ticket gate machine to be magnetically coupled when the ticket card 210 is brought close to the ticket gate machine so that information necessary for ticket examination is automatically exchanged.

Hereafter, in order to make it easy to understand later description, structures and operations of the above-mentioned two types of wireless IC tags/cards will be described with reference to Non-Patent Document 2 and the like.

Figure 21:
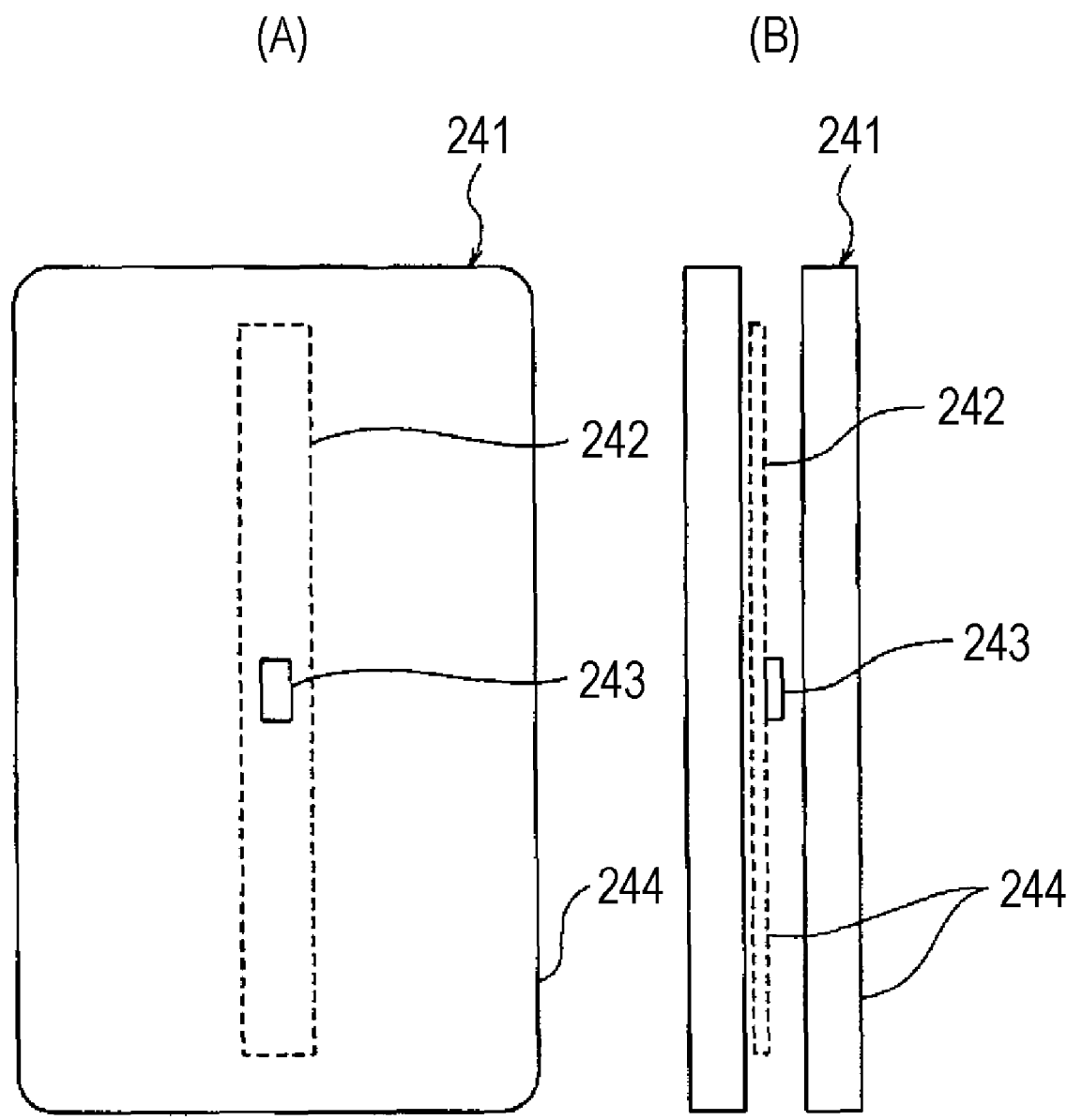
FIG. 21 includes drawings (a plan view (A) and a sectional view (B)) showing a structure (FIG. 6.9 in Non-Patent Document 2) of a ticket of the 2005 World Exposition.

First, an outline of a wireless IC tag system including a wireless IC tag (RFID) and a reader/writer will be described. Then, the structure and operations of the current wireless IC tag will be roughly described with reference to FIG. 19 (corresponding to FIG. 3.1 on page 30 in Non-Patent Document 2) and FIG. 21.

Figure 19:
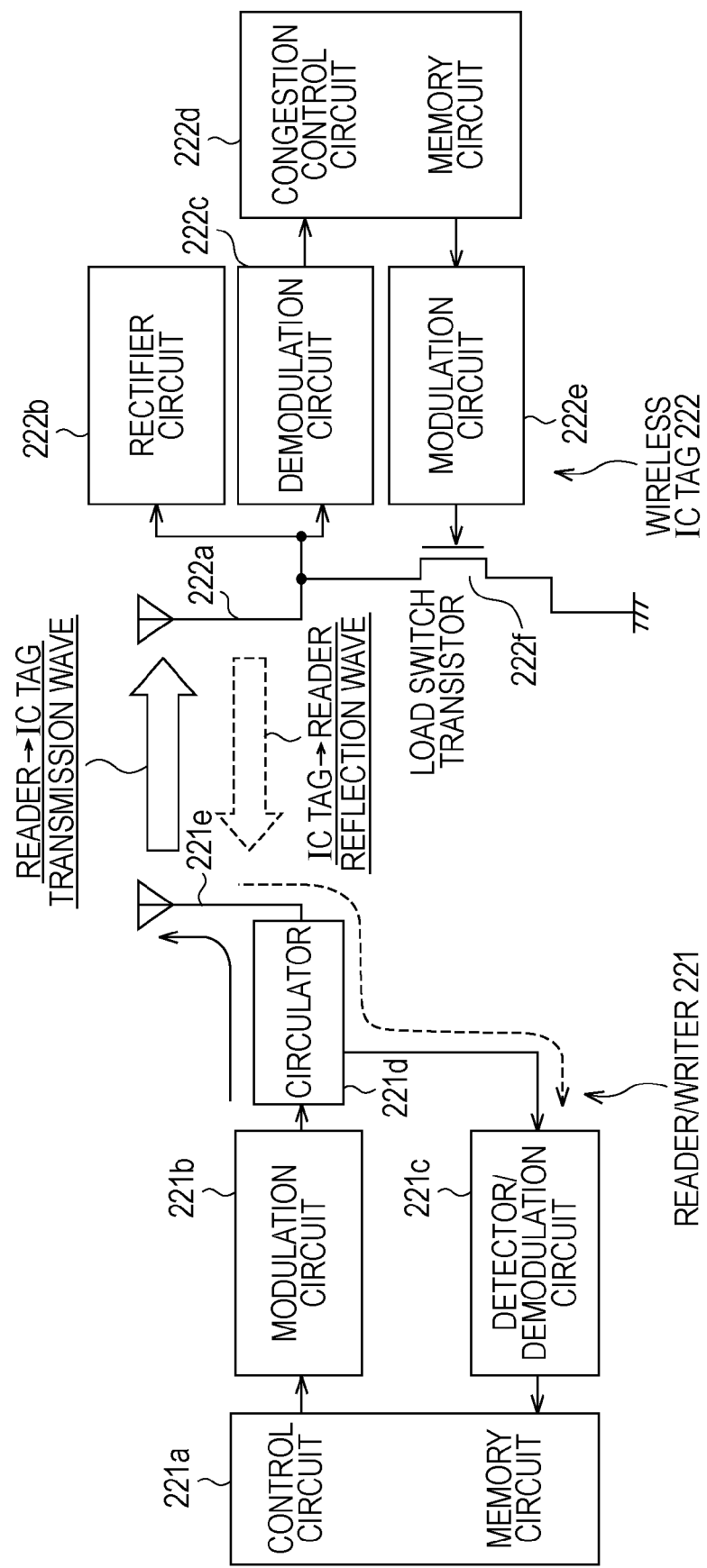
FIG. 19 is a schematic diagram showing a state in which a related-art reader/writer is reading out data in stored in a wireless IC tag.

FIG. 19 shows an outline configuration of a system for reading out data from a wireless IC tag. The left part of FIG. 19 is a reader/writer 221 and the right part thereof is a wireless IC tag 222. The reader/writer 221 includes a control circuit/memory circuit 221a, a modulation circuit 221b, a detector/demodulation circuit 221c, a circulator 221d serving as a transmission/reception branching filter, an antenna 221e, and the like. On the other hand, the wireless IC tag 222 includes an antenna 222a, a rectifier circuit 222b, a demodulation circuit 222c, a congestion control circuit/memory circuit 222d, a modulation circuit 222e, a load switch transistor 222f, and the like.

First, an operation for reading out information stored in the wireless IC tag 222 will be described. When information stored in the wireless IC tag 222 is read out, the reader/writer 221 transmits instruction information for reading out the data in the form of a digital signal from the control circuit 221a. Then, the modulation circuit 221b receives the digital signal and modulates a carrier wave having a radio frequency (typically, a frequency in the 900 MHz or 2.45 GHz range) caused therein and then transmits the modulated carrier wave from the antenna 221e via the circulator 221d (irreversible circuit) serving as a transmission/reception branding filter. This modulated carrier wave (a signal having a radio frequency) is not only a signal modulated using the readout instruction information but also becomes direct-current driving power after received by the wireless IC tag 222. Therefore, considering also an attenuation (presumably 10 to 20 dB) caused by the propagation of the carrier wave over a radio distance from the antenna 221e of the reader/writer 221 to the antenna 222a of the wireless IC tag 222, the carrier wave is transmitted using power (roughly several hundreds mW) necessary and sufficient to drive the wireless IC tag 222.

The wireless IC tag 222 receives the signal having a radio frequency transmitted from the reader/writer 221 via the antenna 222a and transmits most of the received power (several mW) to the rectifier circuit 222b to convert the power into direct-current power. Then, the wireless IC tag 222 temporarily accumulates the direct-current power by charging an internal capacitor (not shown) of the wireless IC tag 222. The remaining power is sent to the demodulation circuit 222c that operates by the direct-current power accumulated as described above, and is demodulated into the original readout instruction signal. This demodulated readout instruction signal is sent to the control circuit/memory circuit 222d and operates therein so that information stored in this memory circuit is read out. Then, the load switch transistor 222f is on/off driven on the basis of the read-out information. Thus, the magnitude of an impedance with respect to the carrier wave having a radio frequency is changed in a prescribed repetition cycle so that the impedance at a radio frequency seen from the antenna is switched. Then, a reflection wave pulse-amplitude-modulated in accordance with a change in the reflection coefficient with respect to the carrier wave is transmitted from the antenna of the wireless IC tag 222 to the antenna of the reader/writer 221.

The reader/writer 221 receives the pulse-amplitude-modulated reflection wave transmitted from the wireless IC tag 222, leads the reflection wave to the detector/demodulation circuit 221c via the circulator 221b having a function of separating a transmission wave and a reception wave, demodulates and identifies data read out from the wireless IC tag, and stores the data in the memory circuit 221a.

Figure 20:
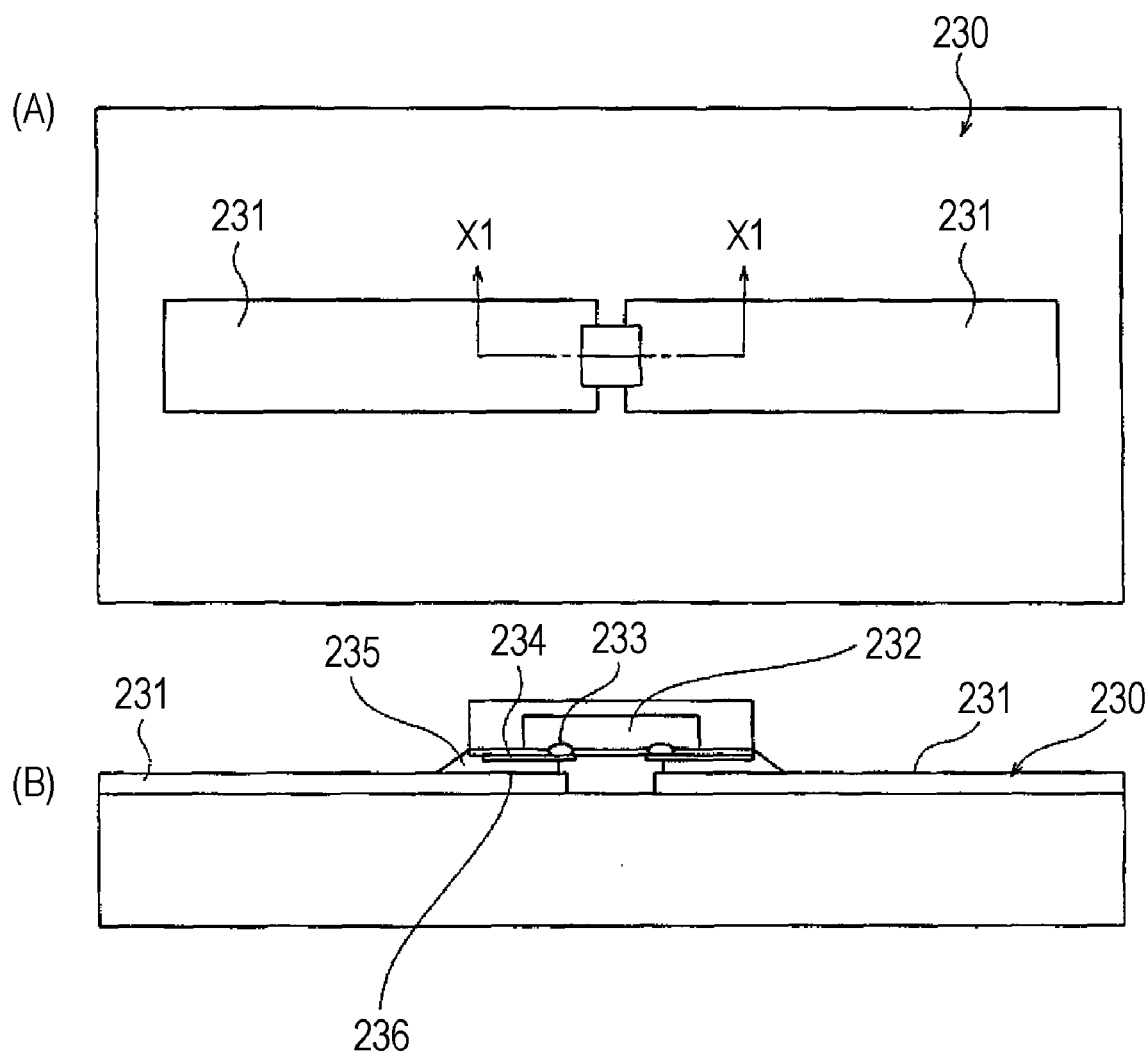
FIG. 20 includes a disposition diagram (A) of parts of a related-art noncontact dipole antenna-type IC card and a sectional view (B) taken along line X1-X1 of (A).

FIG. 20 schematically shows an example structure of a wireless IC tag. In FIG. 20, (A) shows a plan view of the wireless IC tag and (B) shows an enlarged sectional view taken along line X1-X1 of (A). A wireless IC tag 230 according to a related-art example has a structure in which a semiconductor chip 232 is mounted on a dipole antenna 231 formed on a substrate using printing wiring technology. While a simplest dipole antenna is shown in the illustrated example, the dipole antenna takes various shapes in accordance with the frequency or the design of the orientation thereof. The dipole antenna 231 has a length that is approximately half a wavelength corresponding to a radio frequency and is allowed to efficiently receive power transmitted from the reader/writer 221 as described above. Since the dipole antenna 231 is one of antennas having the simplest structure and has a low gain and no sharp orientation, it is advantageous in that it can receive radio waves (signals having a radio frequency) from any directions. However, the antenna is not limited to the dipole antenna 231. For example, a loop antenna may be used. An antenna disposed on a sheet is sometimes called an "inlet."

Among example applications of the wireless IC tag (RFID) 230 as described above is the system for managing tickets and pavilion tours in the 2005 World Exposition, so-called "Love Earth Expo," held in 2005. According to FIG. 21 ((A) is a plan view, (B) is a sectional view) cited from FIG. 6.9 in Non-Patent Document 2, a wireless IC tag 241 serving as a ticket is different from the configuration and structure of the card-type wireless IC tag shown in FIG. 20 in that the wireless IC tag 241 has a structure in which a semiconductor chip 243 is connected to a conductor foil 242 serving as an external antenna and the semiconductor chip 243 and conductor foil 242 are interposed between two pieces of plate-like paper 244. However, these wireless IC tags have the same basic functions.

The system for managing tickets and pavilion tours in "Love Earth Expo" is a typical one of examples in which service for visitors is significantly improved by using 2.45 GHz wireless IC tags. An advantage of the system will be briefly described with reference to FIG. 22 cited from FIG. 6.11 in Non-Patent Document 2.

Figure 22:
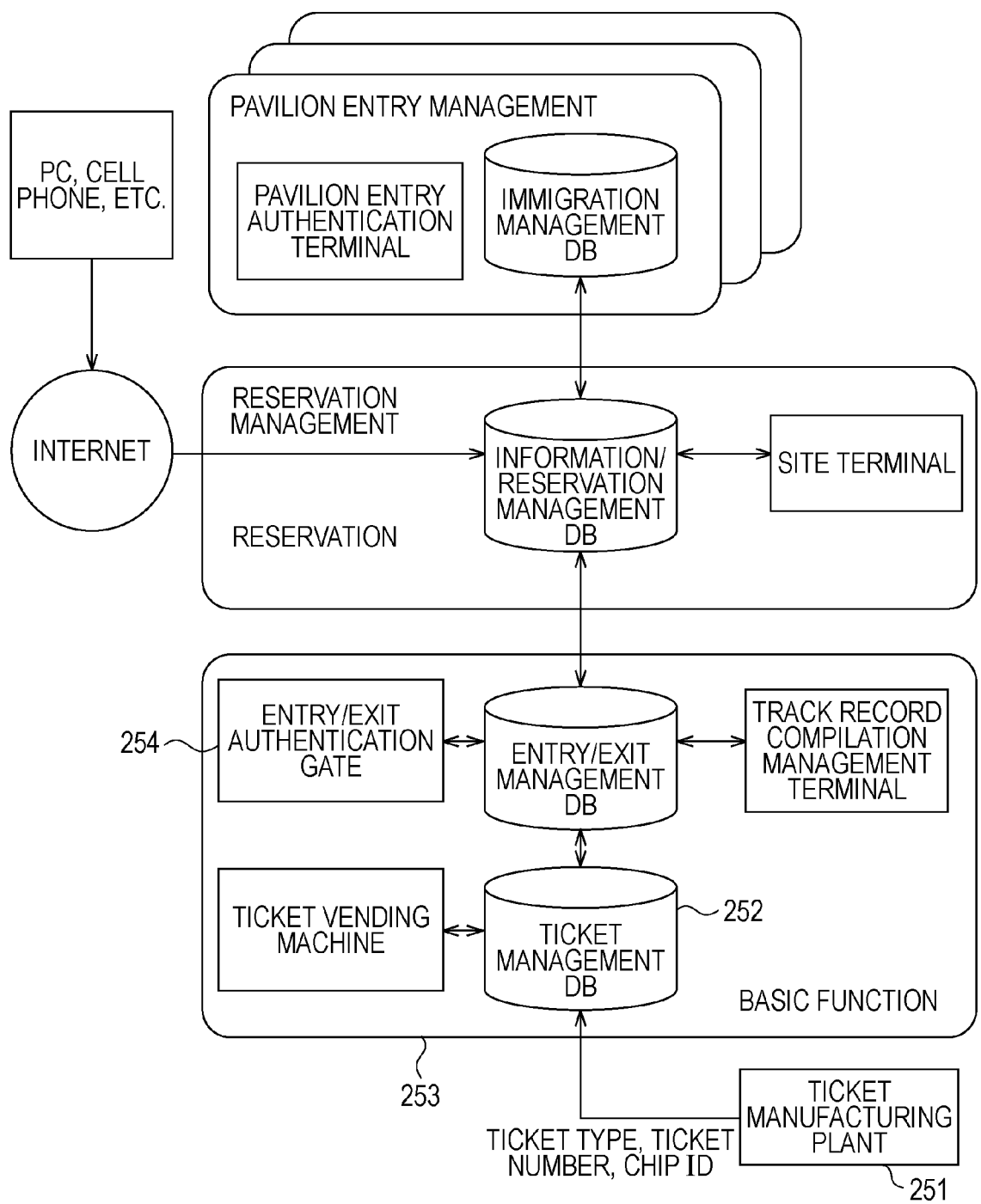
FIG. 22 is a schematic diagram of "Love Earth Expo" admission system that is an example of an RFID system.

As shown in FIG. 22, this system starts to work when wireless IC tags, that is, RFIDs (tickets) each including a semiconductor chip are manufactured at a ticket manufacturing plant 251. Chip IDs and tickets are manufactured at the ticket manufacturing plant 251. Then, the chip IDs are stored in a ticket management DB 252. Basic function 253 compiles and manages data on issued tickets, data on the authentication of entry and exit, and the like in real time. An entry/exit authentication gate 254 is provided with the reader/writer 221 described with reference to FIG. 19. The reader/writer 221 transmits signal waves for reading out information to RFIDs from a position a predetermined range away from the RFIDs so as to write information sent to the memory circuit into the RFIDs or read out information stored in the RFIDs to use the read-out information for entry/exit management. Also, the reader/writer 221 shown in FIG. 19 is provided at a tour reservation gate located in front of each pavilion so that a reservation for admission to a pavilion that a visitor wants to visit is automatically made. By using wireless IC tags (RFIDs) as tickets as described above, service for visitors is significantly improved.

Next, operations of the above-mentioned train ticket card that is an example of other wireless IC cards will be described with reference to FIG. 23.

Figure 23:
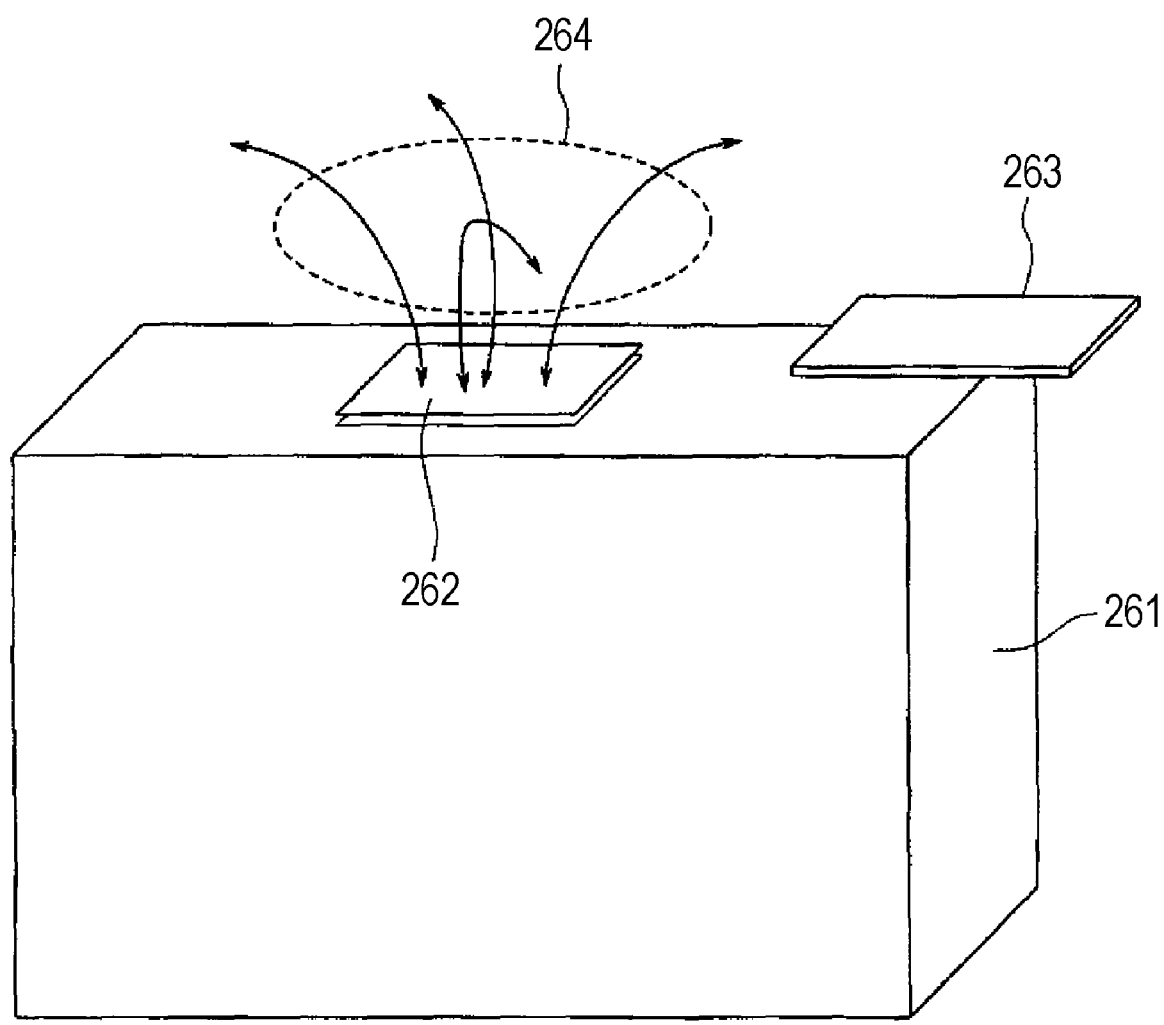
FIG. 23 is a perspective view showing an example of a train ticket card (related-art noncontact IC card) readout apparatus.

FIG. 23 shows the appearance of a ticket gate machine. This ticket card readout/write system, that is, the basic part of the ticket gate machine includes a reader/writer 262 provided at an entry/exit gate 261 and including a coil for coupling and a ticket card 263 that each user individually has. When a user passes through the entry/exit gate 261, the user holds the ticket card 263 over the reader/writer 262. At that time, a coil of the reader/writer 262 and a coil of the ticket card 263 are coupled by a magnetic field/magnetic flux 264 so that the transmission and reception (communications) of information and the transmission of power is performed.

A rough internal structure of the ticket card 263 is the same as that of the ticket card 210 shown in FIG. 18. The ticket card 263 includes the above-mentioned spiral coil 211 formed on a card substrate and a semiconductor chip 212 electrically connected to the coil using a technology such as bonding and intended to write or read out information.

Figure 24:
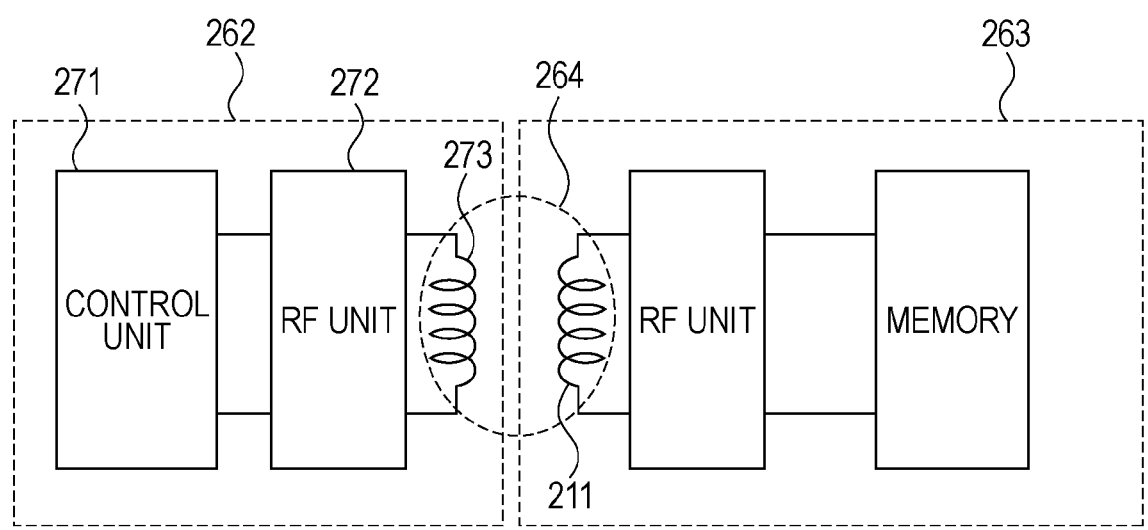
FIG. 24 is a schematic view showing that a reader/writer coil and an IC card coil are magnetically coupled so as to read out data from a magnetic coupling-type noncontact IC card.

A magnetic field/magnetic flux that couples the reader/writer 262 included in the ticket gate machine and the ticket card 263 is shown as a reference numeral 264 in FIG. 23. An equivalent circuit representing the coupling state caused by the magnetic field/magnetic flux 264 is shown in FIG. 24. As shown in FIGS. 23 and 24, an RF unit 272 modulates a carrier wave (electromagnetic field) having a frequency of 13.56 MHz using a signal including a control signal generated by a control unit 271 of the reader/writer 262 and intended to read out information from the ticket card 263. This modulated carrier wave (electromagnetic field) passes a high-frequency current through a coil 273 connected to the reader/writer 262. Thus, a magnetic field/magnetic flux ("264" in FIG. 23) is generated. The magnetic field/magnetic flux 264 generated by the modulated carrier wave provides power for driving an electronic circuit in the ticket card 263 as well as a signal transmitted from the reader/writer 262.

As shown in FIG. 23 or 24, the magnetic field/magnetic flux 264 generated by the coil 273 of the reader/writer 262 is interlinked to couple with a spiral coil (coil 211 in FIG. 18) provided around the ticket card 263 and thus a signal and power are transmitted between the coils wirelessly.

In order to efficiently (with less loss) transmit a signal and power between the reader/writer coil 273 and ticket card coil 211, it is important that the two coils are closely coupled. In other words, the amount of leakage of the generated magnetic flux must be small. For that purpose, the distance between the two coils must be a given value (several tens of mm in the case of the ticket card system using 13.56 MHz) or less. This distance is nearly in proportion to the sizes of the two coils. Therefore, if the sizes of coils are reduced, the distance between the two coils must be reduced in proportion to the sizes of the coils so as to ensure the same level of coupling.

The above description about the write or readout into or from the ticket card 263 also applies to operations of a commutation ticket, electronic money, or the like having a similar structure and a similar operation principle.

The manufacturing cost of a wireless IC tag/card has been gradually reduced and a wireless IC tag/card has been actually used in train cards, electronic money, and the like. However, the manufacturing cost of a wireless IC tag/card is still relatively high as an RFID; therefore, applications of a wireless IC tag/card are limited and a wireless IC tag/card has not been widely used.

If an RFID becomes an ultrasmall chip measuring several hundred μm or less per side and becomes cheaper, it is considered to apply such an RFID to the identification of a document having a property value, such as a bank note or a marketable security. Specifically, if an ultrasmall RFID is embedded in a bank note or a marketable security that can be bent more easily than a card, it is conceivable that a counterfeit bank note or the like can be easily discovered and such ease of the discovery can prevent a bank note or the like from being counterfeited. Such an attempt has been made in various fields, as seen in Non-Patent Document 1.

The present invention was made in such a background and relates to a technology for connecting a chip including a circuit for storing information readable or identifiable using a signal wave from a reader/writer and an antenna for receiving the signal wave transmitted from the reader/writer in a non-contact manner, and a base sheet provided with such a chip and an antenna.

An IC chip having an RFID function described in Non-Patent Document 1 is an ultrasmall, square chip measuring 450 μm per side and having a thickness of several tens of μm. The size of the IC chip is reduced as described above so as to make a chip made of a semiconductor (silicon) crashworthy against bending stress or the like. Also, such a reduction in size of the chip significantly reduces the manufacturing cost per chip.

Figure 3:
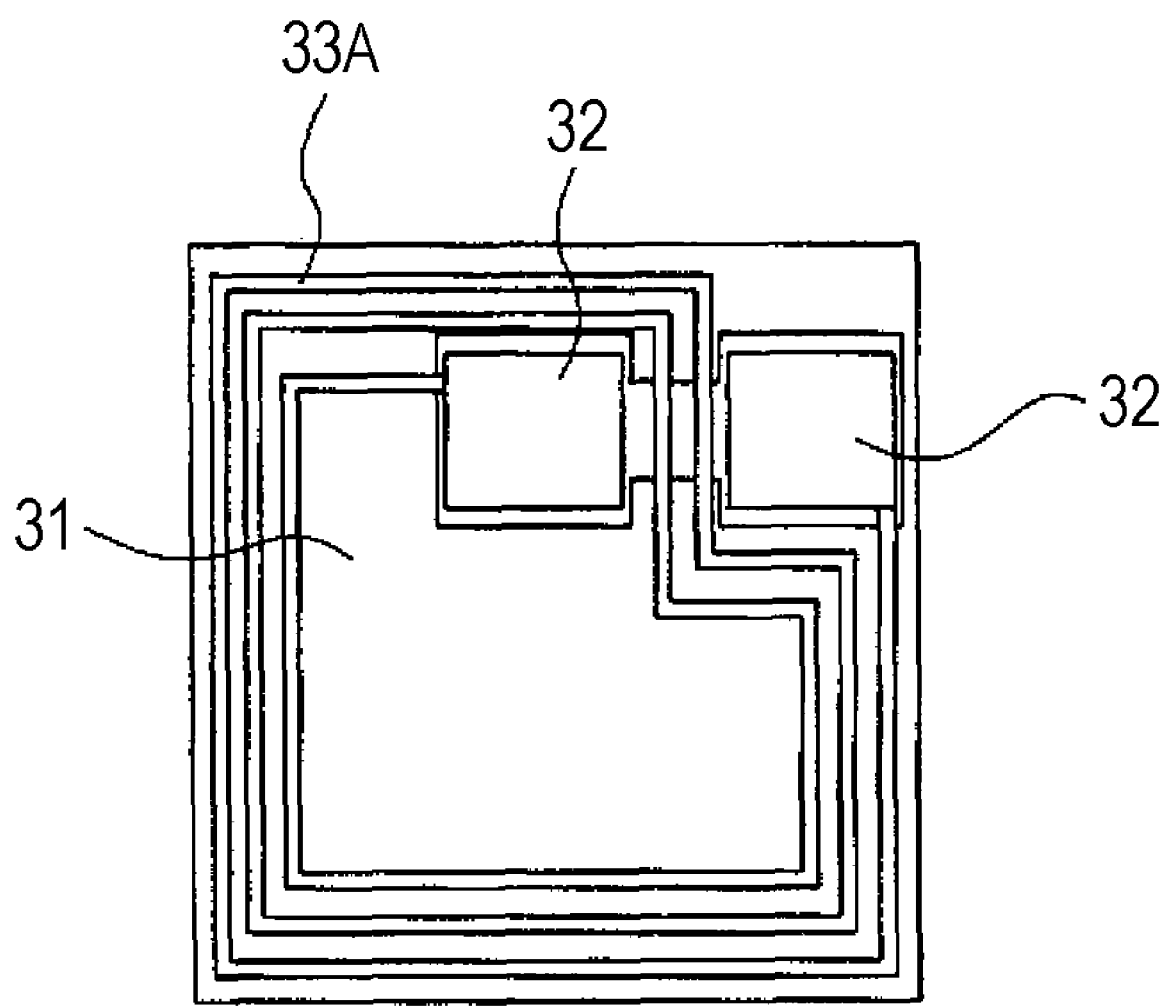
FIG. 3 is schematic plan view of an LC tank circuit used in an experiment of magnetic coupling according to the present invention.
Figure 25:
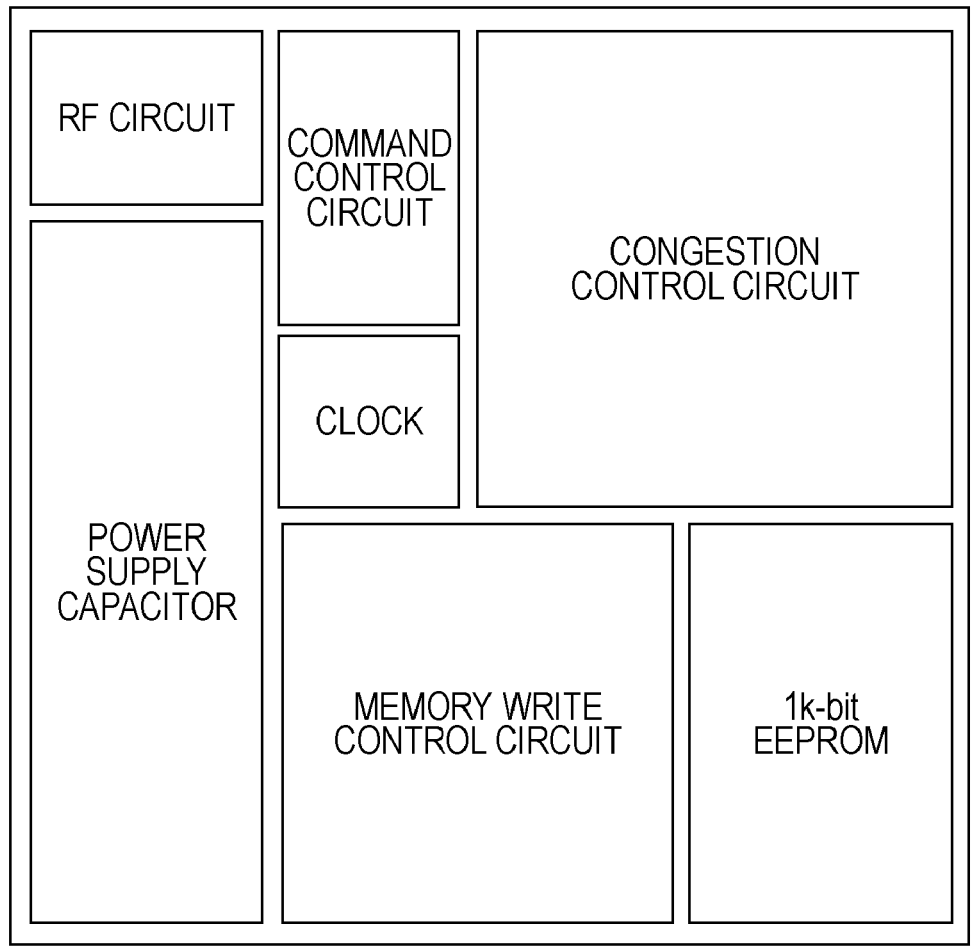
FIG. 25 includes diagrams showing two examples (A) and (B) of functions included in an ultrasmall wireless IC chip.
Figure 25:
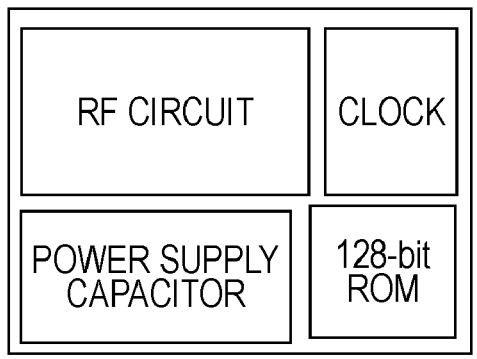

Since this chip is much smaller than a typical RFID chip, it includes only required minimum circuits among an RF circuit, a power supply circuit, a command control circuit, a congestion control circuit, a clock generation circuit, a memory write control circuit, and an EEPROM (electrically writable and erasable memory) included in a typical RFID chip, like circuit blocks of a function-oriented IC tag chip (A) or circuit blocks of an ultrasmall size-oriented IC tag chip (B) shown in FIG. 25 (see FIG. 3.21 on page 50 in Non-Patent Document 2). Specifically, the chip includes only an RF circuit, a power supply circuit, a clock generation circuit, and a read-only memory (ROM) of 128 bits.

In order to make an RFID chip ultrasmall as described above, it is preferable to provide, on the chip, an antenna for receiving a signal wave transmitted from a reader/writer, reading out internal data, and transmitting the data. By doing so, an RFID chip can be easily made in a bank note or a marketable security so that the RFID chip is used, for example, to prevent a bank note or the like from being counterfeited, as described above.

What is needed first for that purpose is to increase the frequency of a radio signal for reading out a signal so as to downsize an antenna. Specifically, it is said that some frequencies in a range of 2.4 to 2.5 GHz that is the IMS range (a frequency range for industry, medical care, and science), which is currently being used for wireless LANs are suitable. The spatial half-wavelength is about 60 mm in this frequency range; therefore, this frequency range can be easily used in terms of size.

However, even if the half-wavelength is 60 mm, the half-wavelength is two digits larger in size than a chip. For this reason, there has been considered a method of providing a spiral coil on an RFID chip, also providing a coil on a reader/writer, and coupling these coils typically by a magnetic field/magnetic flux (Non-Patent Document 1). This method is a method devised under a technical idea similar to that seen in a wireless IC card such as the above-mentioned ticket card. This method is a method of making a spiral coil, which is conventionally formed on a card substrate in the related art, much smaller than the wavelength so that the spiral coil acts as an inductance even at 2.45 GHz, forming the spiral coil on an IC chip, under a technical idea similar to that of a wireless IC card, bringing the on-chip coil and a reader/writer coil having a size similar to that of the on-chip coil close to each other so as to magnetically coupling the two coils, receiving a interrogation signal transmitted from the reader using a radio wave in a microwave range, and operating the chip so as to read out information stored in a ROM.

However, if this method is examined precisely, it is difficult to obtain power sufficient to drive a control circuit of the IC chip from the interrogation signal of several hundred mW or so in a microwave range when attempting to ensure an actually required distance (e.g., several tens of mm) between the reader coil and on-chip coil. This is also understood from a fact that if an estimate is made from a readable distance (approximately 40 mm) from a train ticket card (wireless IC card) using 13.56 MHz as a radio frequency, in accordance with the scaling law, the readable distance is 0.2 mm at most on a coil formed on a chip measuring 450 μm per side thereby making it extremely difficult to use the magnetic coupling method.

As described above, it is difficult for the coil provided on the ultrasmall chip to sufficiently couple with the reader/writer. For this reason, there has been considered the method described with reference to FIGS. 18 and 20, that is, a method of connecting an ultrasmall wireless IC chip to an antenna for transmitting an electromagnetic wave, such as a half-wavelength dipole antenna, receiving a readout control signal and a power supply radio wave transmitted from an electromagnetic wave transmission-type antenna connected to a reader/writer, and then transmitting data stored in a memory on the chip from the wireless IC chip antenna using a readout signal.

A 2.45 GHz wireless IC tag (RFID) using the above-mentioned method will be described in more detail. As already described as a general theory, this method uses electromagnetic wave transmission-type antennas as the antenna of a reader/writer and the antenna of a wireless IC tag and typically uses a so-called "half-wavelength dipole antenna" having a length (approximately 60 mm) that is approximately half the spatial wavelength (approximately 120 mm) at an operational frequency of 2.45 GHz. In this case, the wireless IC chip and the dipole antenna must be electrically connected to each other. If two antenna connector ends of the wireless IC chip are disposed in an identical plane, a method as shown in FIG. 20 is used. Specifically, electrical connection is realized by using a method of boding a terminal 234 connected to a connection bump 233 provided on a surface of the wireless IC chip 232 to a conductor surface 236 of the antenna using an anisotropic, conductive adhesive 235. This method allows keeping insulation between two bumps distant from each other while allowing establishing electric transmission between a bump, which is extremely close to the antenna conductor, and the antenna conductor using the contact between metal particles contained in the adhesive.

On the other hand, Non-Patent Documents 1 and 2 describe a method for connecting a wireless IC chip having a structure in which connection electrodes are provided on the upper and lower sides of the chip, to an antenna. In this case, there is adopted a method of placing a wireless IC chip on the conductor part of a dipole antenna and placing a conductor on the chip with an isotropic, conductive adhesive therebetween so as to interpose the chip between the conductor part and the conductor to ensure the connection. This method is used as a relatively practical method particularly for an ultrasmall chip.

This method allows manufacturing a chip itself at low cost by using a semiconductor manufacturing process; however, the method requires mechanical work such as bending and crimping of a fine object so as to connect the chip to an antenna and requires considerably fine work. Also, this method has a problem that there occurs a nonnegligible reduction in reliability of the connection due to stress, such as bending of the connection part with the antenna.

In order to avoid the above-mentioned problem with electrical connection between the IC chip and antenna, there is also considered a method of accumulating and forming an antenna on a chip monolithically. However, as for a method of forming a dipole antenna on a wireless IC chip, the antenna occupies most of the area of the wireless IC chip thereby making the IC chip too large. As a result, the manufacturing cost is obviously increased to a practically unacceptable level.

[Non-Patent Document 1] Mitsuo Usami, "Ultrasmall Wireless IC Tag Chip 'μ-Chip'," OYO BUTURI, Vol. 73, No. 9, 2004, pp 1179 to 1183.

[Non-Patent Document 2] Mitsuo Usami, Jun Yamada, "Ubiquitous Technology IC Tag," first edition, Ohmsha, Ltd., 2005 Mar. 25, pp 115.

DETAILED DESCRIPTION

As described above, if the RFID chip technology is used to identify a bank note or a marketable security made of paper, which can be bent more easily than a card, the following two problems must be resolved: (1) a chip for identification must be made very small (ultrasmall) so as to ensure a resistance against bending stress; and (2) in order to couple a circuit for identification in such an ultrasmall chip and a reader/writer away from the chip by a practical distance, an electromagnetic wave transmission-type antenna such as a dipole antenna must be coupled to this chip while ensuring low cost and high reliability.

The above-mentioned problems will be described a little more specifically in relation with the application to bank note authentication.

First, an antenna having a size equal to the wavelength of a radio frequency cannot be manufactured on a surface of a semiconductor chip sufficiently small to be fixed onto paper. This makes it difficult to realize magnetic coupling with a distant reader/writer. Second, if a chip is made larger to make an antenna larger, the chip is bent and destroyed. Also, if the chip is made larger, the unit cost of the chip is increased so that the commercialization of the chip is obstructed. Third, it is difficult to print a sufficiently large antenna and bond such an antenna to a minute semiconductor chip physically. Even if such bonding is achieved, the bonding easily undergoes a brittle fracture thereby making it difficult to maintain performance.

In order to make practical an RFID for the application to bank note authentication or other purposes, it is the first necessary condition to miniaturize the above-mentioned semiconductor chip and make the chip low-cost. Also, an antenna that is allowed to provide sufficient power even on a minute chip must be disposed and the antenna and chip must be connected to each other so that power is transmitted therebetween. Further, the structure of the connection must be a structure that is allowed to obtain sufficient connection at an operational frequency and has durability such that the connection is not destroyed, for example, due to bending of a paper-like base.

An object of the present invention is to solve the above-mentioned problems, that is, to provide a base sheet having a structure that couples a chip measuring 1 mm or less on paper and an antenna line by only disposing the chip and antenna line in such a manner that the chip and antenna line are close to each other, without physically bringing the chip into contact with the antenna line.

Another object of the present invention is to provide a base sheet having a structure that is allowed to couple multiple chips and an antenna line on a paper-like base, specifically, a structure that is allowed to connect even a group of ultrasmall wireless IC chips (hereafter referred to as "RF powders") looking like particles to an antenna line at low cost and to use the RFID above or inside the paper-like base despite the low cost.

In order to achieve the above-mentioned objects, a base sheet according to the present invention is configured as described below.

The base sheet according to the present invention includes: a chip wherein a spiral or helical coil having at least one turn is disposed on a surface of the chip, or inside the chip and near the surface; and an antenna line including a conductor orbiting around the coil of the chip or directly above or directly below the coil so that the conductor is magnetically coupled with the coil.

In the above-mentioned configuration, the chip preferably includes a semiconductor circuit for storing wirelessly readable information as well as the coil disposed around the chip, and the coil and the semiconductor circuit are preferably electrically connected to each other.

In the above-mentioned configuration, the conductor part of the antenna line to be magnetically coupled with the coil of the antenna line, the conductor part orbiting around the coil or directly above or directly below the coil, is preferably spiral, helical, or loop-shaped and preferably has one turn or a plurality of turns.

In the above-mentioned configuration, the conductor part of the antenna line to be magnetically coupled with the coil is preferably meandering, and a plurality of the chip are preferably disposed so that the chips are magnetically coupled with the antenna line.

In the above-mentioned configuration, the antenna line is preferably a dipole antenna.

In the above-mentioned configuration, the antenna line is preferably a loop antenna.

In the above-mentioned configuration, a plurality of the antenna line are formed in layers of a multilayered structure.

According to the present invention, the following advantages are obtained.

A chip including a minute semiconductor device such that the semiconductor device is not destroyed even on a bent base sheet like paper or a passive electric circuit element (an inductor or a capacitor) and an antenna allowing transmission of electromagnetic energy and having a size of the wavelength or so are stably coupled.

As for the related art, if no antenna is used, a minute probe antenna must be brought close to a minute coil of a chip so as to obtain magnetic coupling with the chip. While this is suitable for an application where reading out is performed in proximity, this is not a method for transmitting high power in a short period. Accordingly, the related art method cannot operate an RFID including a memory or the like. On the other hand, according to the present invention, power for operating a memory or logic is provided to a minute device even from a relatively distant position. Since a minute semiconductor chip is low-cost, a low-cost, particular RFID can be used in a bank note or a sheet-like base (base sheet), which must be confidential.

Now, best modes (embodiments) for carrying out the present invention will be described with reference to the accompanying drawings.

In general, the principle of electromagnetic transmission is used as a method for transmitting power without requiring physical contact. This principle is typically used when transmitting high power at a low frequency using a power transformer. There already exists an idea of using this principle to transmit an alternating current component at a high frequency range called a "microwave" (for example, see Japanese Unexamined Patent Application Publication No. 2005-340658 (Japan Patent Application No. 2004-159960) "TRANSFORMER CIRCUIT AND MANUFACTURING METHOD THEREOF").

According to this idea, first and second coils are disposed so that the lines of the coils overlap each other in upper and lower layers in such a manner that the lines are insulated from each other, on a thick insulating layer on a semiconductor chip and when a high-frequency is passed through the first coil, a current having an identical frequency is passed through the second coil by magnetic coupling if a circuit is closed. If the circuit is open, a voltage occurs at both edges. This is an action caused in accordance with Maxwell's equations of electromagnetism. Unlike a contact method, this coupling has an advantage that even if the distance between the two coils is changed slightly (by approximately one-tenth the length of the coils), such a change makes no significant change to the coupling for transmitting power. Magnetic coupling is significantly different from the contact method in which power cannot be transmitted if the contact is lost. Also, magnetic coupling makes a large allowance for the distance between the circuits.

While the related art uses a chip and an antenna in such a manner that these elements are in physical contact with each other, the present invention magnetically couples an antenna and a chip by forming a first coil for causing magnetic coupling on the chip and using a part of the antenna as the second coil described in the above-mentioned Patent Document (Japanese Unexamined Patent Application Publication No. 2005-340658). While physical connection requires a high-cost implementation process of connecting a minute chip to an antenna accurately, magnetic coupling is not required to be accurate in position setting like in physical connection. Also, since the two coils are physically distant from each other, there does not occur a problem that electrical contact is disrupted on bent paper thereby causing a failure.

Figure 1B:
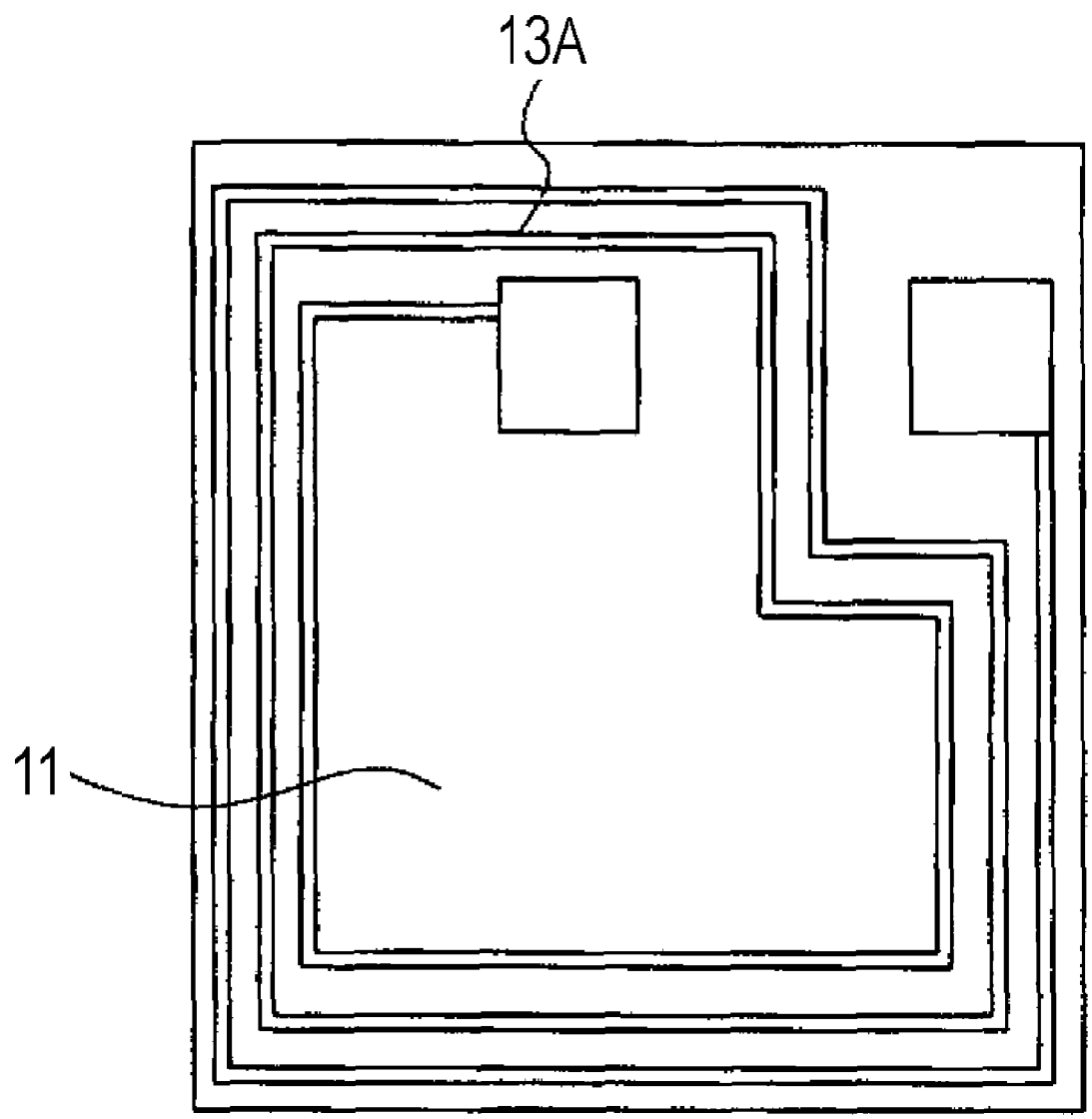
FIG. 1B is an enlarged plan view of the wireless IC chip.
Figure 2:
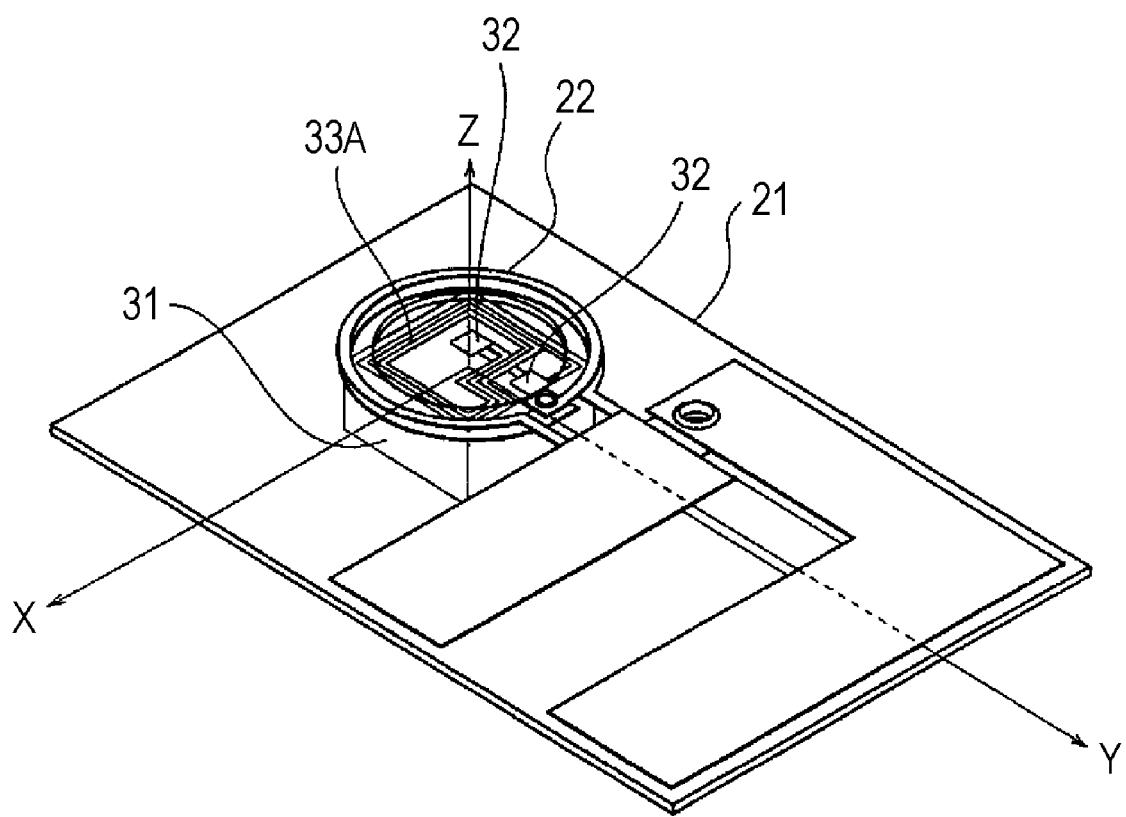
FIG. 2 is a schematic perspective external view showing a magnetic coupling system including a circular coil for antenna coupling and an on-chip coil used in an experiment and a simulation.

Now, referring to the drawings, an example (first embodiment) of a structure of a typical base sheet according to the present invention will be described. Plan views of this base sheet are shown in FIGS. 1A, 1B, and 2. FIG. 1A shows a plan view of the base sheet including a wireless IC chip and an antenna and FIG. 1B shows an enlarged view of only the wireless IC chip. In FIG. 1A, the wireless IC (RFID) chip is drawn on a relatively large scale in order to exaggerate the chip. "11" represents a wireless IC chip and "12" represents a base sheet. The base sheet 12 is made of a flexible sheet material such as paper. The wireless IC chip 11 is a chip formed by disposing a spiral coil 13A on an oxide film formed on a silicon substrate. The coil 13A is connected to a circuit element or a functional circuit block formed inside or on the wireless IC chip 11. An image of this connection state is shown in FIG. 1B, which is an enlarged view. Among examples of the functional circuit block is a circuit including a wireless circuit, a control circuit, a memory circuit, a power supply circuit, and the like and serving as an RFID, for example, in FIGS. 25(A) and (B). Among examples of the circuit element are an MIM capacitor for matching circuits and a resistance.

A first embodiment of the present invention resolves the above-mentioned problem by using the two coils 13A and 14A disposed in such a manner that the coils are extremely close to each other, as the coupling parts between the wireless IC chip 11 and an antenna (or antenna line) 14 on the base sheet 12. Before reaching this invention, the inventors made the following two important technical examinations.

One of the examinations is the relation between the degree of the coupling between the two coils 13A and 14A and the distance therebetween. In this examination, the relation between the distance and the degree of coupling was obtained from an experiment and a simulation using spiral coils (one turn or two or more turns) formed in the form of a square measuring 450 μm per side. As a result, the inventors understood that in order to obtain the practical degree of coupling using coils measuring 450 μm per side, the coils must be formed in almost identical sizes and vertically overlapped by each other and the vertical distance therebetween must be approximately 200 μm or less. Also, the inventors found that this distance is similar to the thickness (approximately 100 μm) of normal paper.

Figure 4:
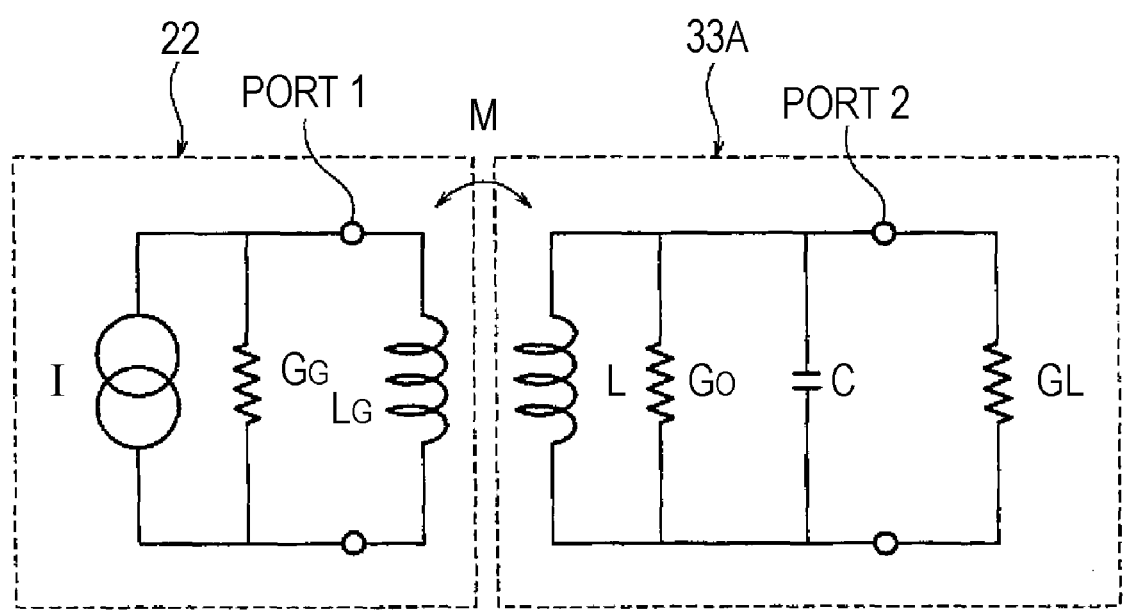
FIG. 4 is an electric circuit diagram showing a model used in a calculation of power transmission caused by magnetic coupling according to the present invention.

FIG. 2 shows a configuration used in the above-mentioned experiment. The configuration has a structure that magnetically couples a two-turn circular helical coil 22 (on-substrate coil 22) formed on a polyimide substrate 21 with a thickness of 25 μm using a copper thin film and a three-turn spiral coil 33A (on-chip coil 33A) formed on a silicon chip 31 measuring 450 μm per side as shown in FIG. 3. An MIM capacitor 32 is connected to the spiral coil 33A on the silicon chip 31 in parallel and is set so that the MIM capacitor resonates at approximately 2.45 GHz. FIG. 4 shows an equivalent circuit including a signal source. This equivalent circuit is obtained using the input end of the above-mentioned helical coil 22 as a port 1 and both ends of the spiral coil 33A on the silicon chip 31 as a port 2 serving as the output port. In FIG. 4, "I" represents a current source serving as a signal source, "$G_G$" represents a signal source conductance, "$L_G$" represents a self-inductance of the on-substrate coil 22, "L" represents a self-inductance of the on-chip coil 33A, "M" represents a mutual inductance representing the coupling between the on-substrate coil 22 and on-chip coil 33A, "C" represents the capacity of the MIM capacitor, "$G_O$" represents a conductance representing a loss of a tank circuit including the on-chip coil 33A and MIM capacitor 32, and "GL" represents a load connected to this tank circuit (in an actual wireless IC chip, this load corresponds to an RF circuit or the like).

Figure 5:
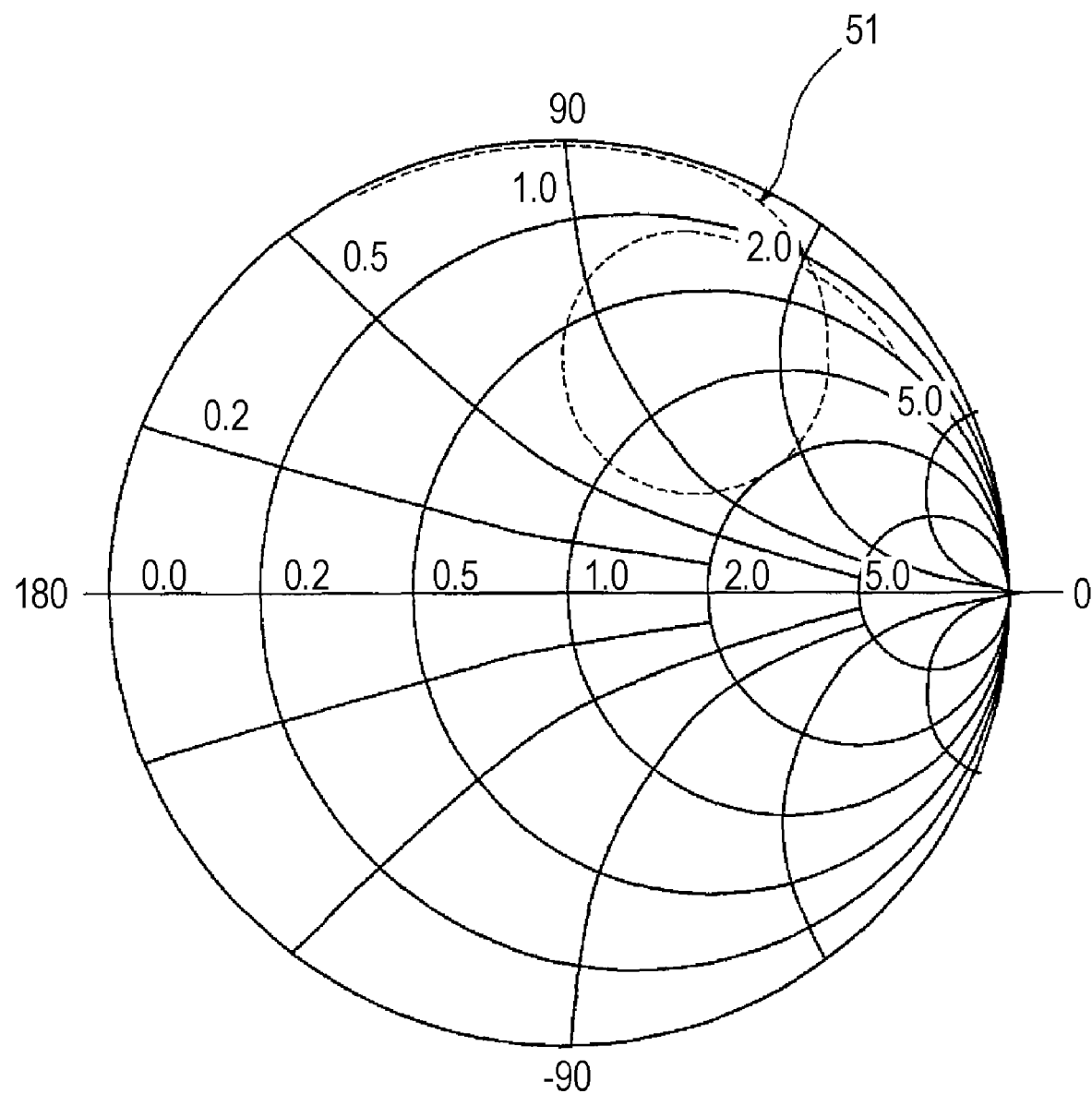
FIG. 5 is a Smith chart (experimental values) of a reflection coefficient of a system for coupling with an on-chip coil seen from a reader/writer coil.

In the experiment, first, a reflection coefficient seen from the input port of the on-substrate coil 22 was measured in a state in which the load is not connected to the on-chip coil 33A, that is, the port 2 (that is, in a state of $G_L$=0). An example of the result is shown in FIG. 5 as a reflection coefficient chart 51 (so-called "Smith chart"). In this chart, resonance is seen at approximately 2.5 GHz.

On the other hand, the circuit disposition configuration shown in FIG. 2 was analyzed using commercially available software for electromagnetic field simulation. In this analysis, a reflection coefficient seen from the port 1 of the on-substrate coil 22 under a condition (in a state in which the load in the equivalent circuit shown in FIG. 4 is not connected, that is, in a state of $G_L=0$) identical to the condition under which the experiment was conducted and a scattering coefficient matrix (also called "S parameter" or "S matrix") using the ports 1 and 2 as the input end and output end were obtained with the distance between the two coils changed. In the simulation, data indicating the shapes of the coils used in the experiment was used.

Figure 6:
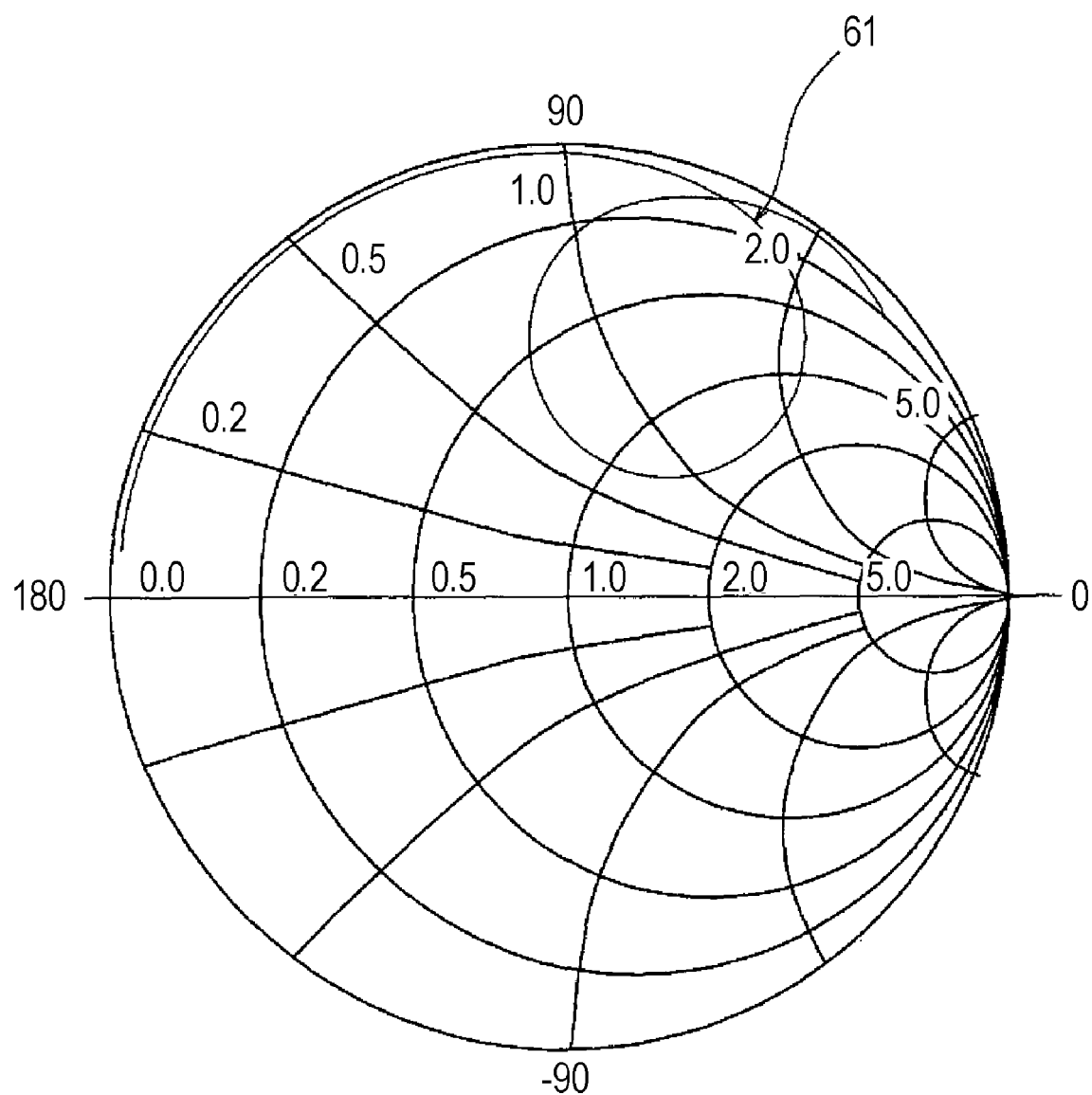
FIG. 6 is a Smith chart (simulation values) of a reflection coefficient of a system for coupling with an on-chip coil seen from a reader/writer coil.

A Smith chart 61 that is a reflection coefficient chart obtained in the simulation is shown in FIG. 6. Since the values shown in this chart roughly match the experimental values shown in FIG. 5, it is obviously no problem to use the results of simulations performed under other conditions as theoretical experiment results.

Figure 7:
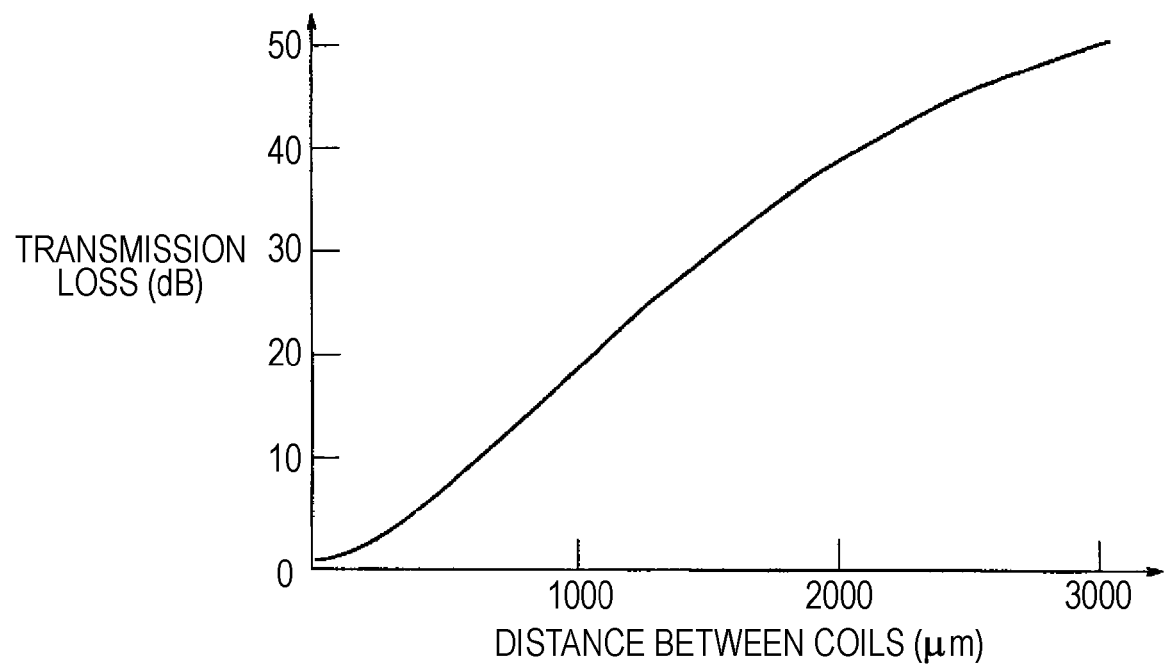
FIG. 7 is a graph showing the dependence of a power transmission loss from the reader/writer coil to the on-chip coil on the distance (gap) between the coils.

Next, a result of calculation of maximum available power losses obtained from the S parameter obtained from the simulation are shown in FIG. 7 using the distance between the two coils as a parameter. From the result, it turned out that when the distance between the two coils 22 and 33A comes close to approximately 10 to 20 µm, the power transmission loss from the port 1 to the port 2 falls within 1 to 2 dB or so and when the distance becomes approximately 200 µm, the power transmission loss is significantly increased, e.g., to 5 to 6 dB or so.

The above-mentioned results were made clear only after both the experimental examination and theoretical examination were made. Thus, the feasibility of the present invention was verified as a principle.

Figure 8:
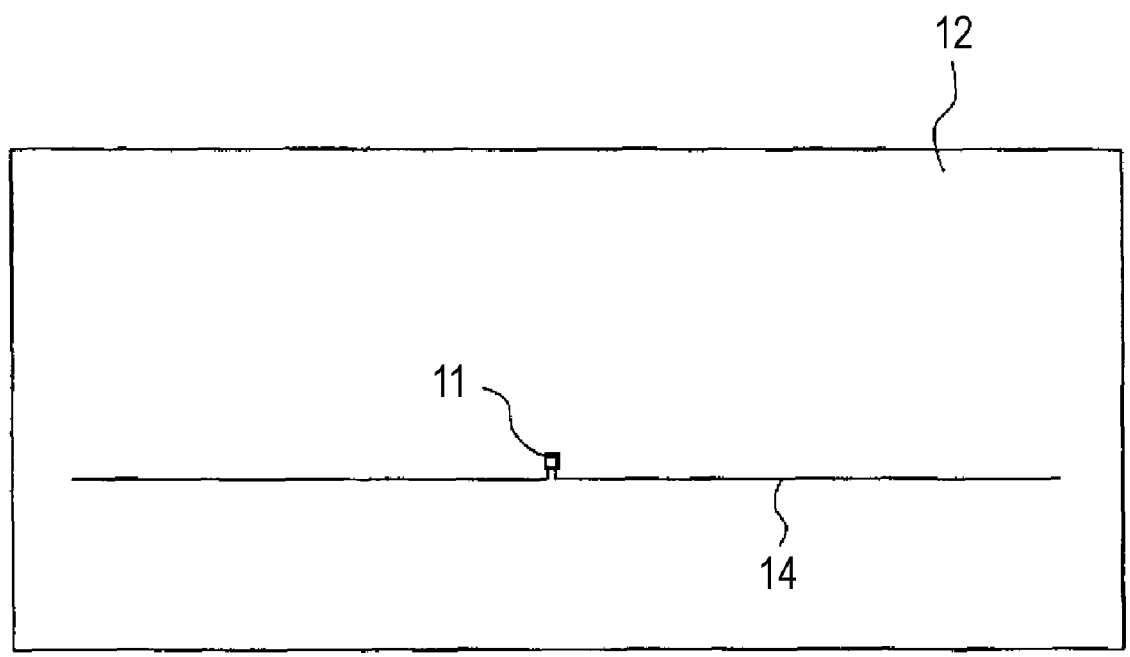
FIG. 8 is a plan view showing an actual disposition relation between the wireless IC chip and dipole antenna shown FIG. 1A in the form of an image.

On the basis of the results of the above-mentioned basic technical examinations, a basic configuration of the present invention will be described with reference to FIGS. 1A and 8. In FIG. 1A, the three-turn spiral coil 13A on the wireless IC chip 11 and the one-turn coil 14A disposed in the form of a loop in such a manner that the coil 14A surrounds the coil 13A as if the coil 14A were going around the coil 13A are magnetically coupled. Hereafter, the structure of the coil (or loop) 14A coupled with the coil 13A on the wireless IC chip 11 and connected to an antenna 14 on the base sheet 12 such as paper will be referred to as the "coupling part" and a structure including the coil 13A on the wireless IC chip 11 and the coupling part will be referred to as the "coupling unit." While the wireless IC chip 11 is disposed approximately in the center of the coil 14A of the antenna 14 in FIG. 1A, a displacement of the wireless IC chip 11 within the coil 14A does not become a significant obstacle to the magnetic coupling. This is also confirmed from the result of the examination made using an electromagnetic field simulation technology. FIG. 8 is schematic diagram shown in such a manner that the size relation between the wireless IC chip 11 and antenna 14 is brought close to the actual size relation.

In the above-mentioned configuration, the length of the antenna 14 on the base sheet 12, that is, the length of the dipole antenna line is preferably half the wavelength; however, the size may be changed depending on the use purpose or due to a manufacturing limit.

The same thing applies to the coil 13A on the wireless IC chip 11. That is, the coil 13A on the wireless IC chip 11 may be any of a single-turn coil, a spiral coil, and a helical coil. Also, the coil 13A may take any shape such as a square, a polygon, a circle, or an ellipse.

Next, assuming that a half-wave dipole antenna connected to a reader/writer has the same structure and size as those of the half-wave dipole antenna on the base sheet 12, a transmission characteristic was obtained at a frequency near 2.4 GHz with the distance between the two antennas. As a result, the transmission loss was a little over 20 dB when the distance between the two antennas 300 mm. By considering also a small transmission loss (1 to 2 dB) caused when the coil 13A on the wireless IC chip 11 and the coupling part coil 14A of the antenna 14 on the base sheet 12 are coupled, it is determined that readout is possible up to this distance or so.

Figure 9:
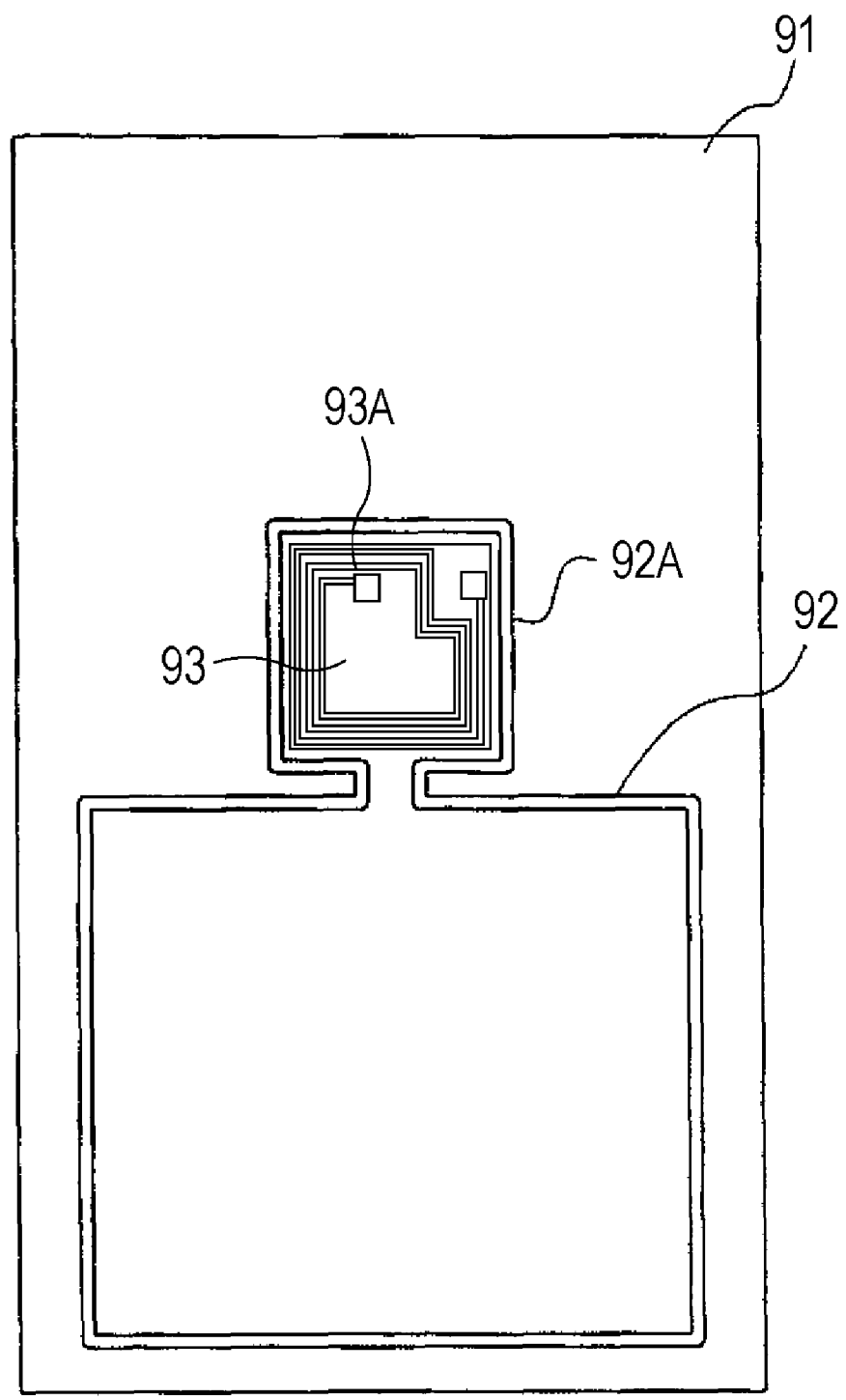
FIG. 9 is a disposition plan view of a loop antenna to be magnetically coupled with a wireless IC chip in a case where the wireless IC chip is located inside the loop antenna.
Figure 10:
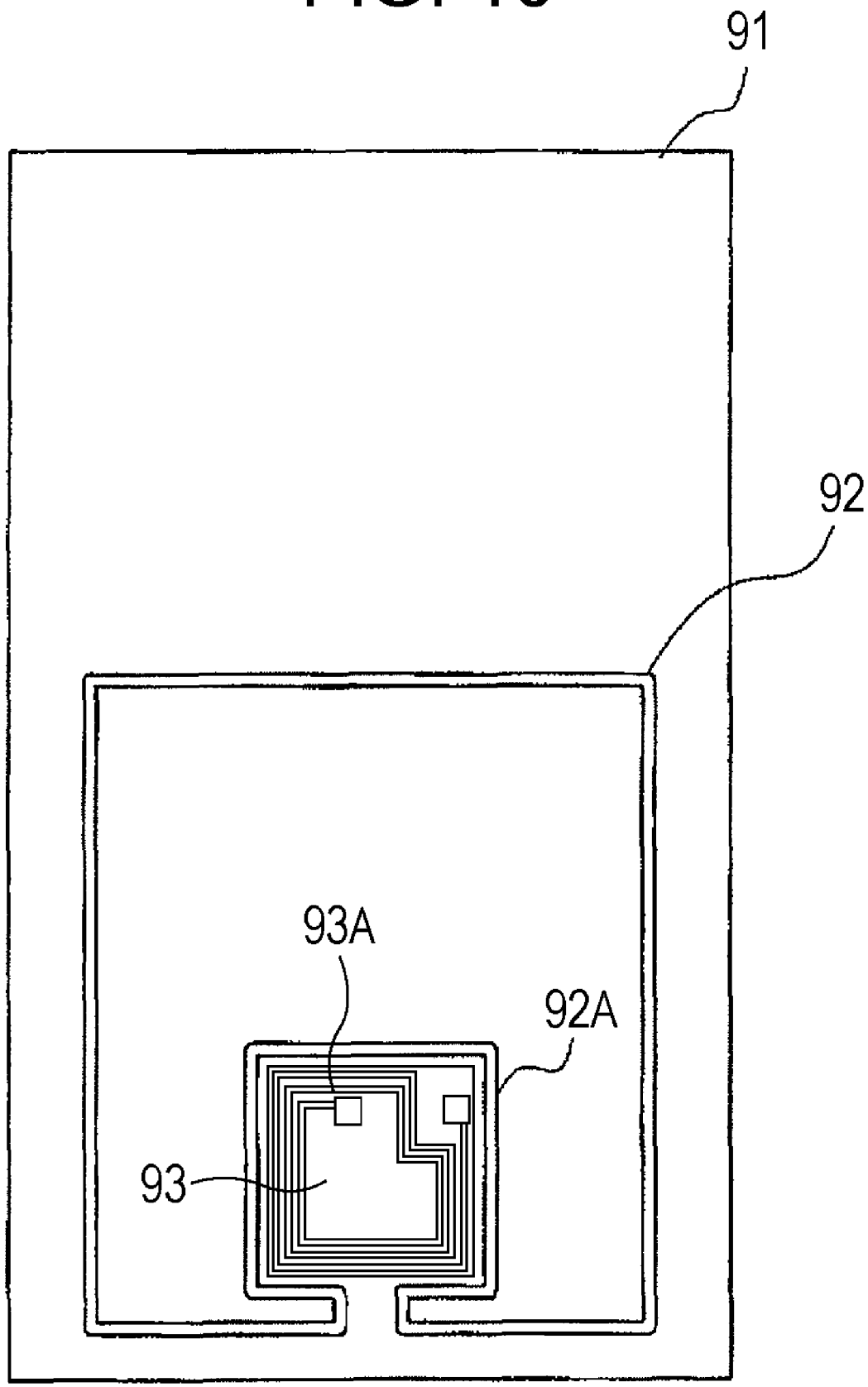
FIG. 10 is a disposition plan view of a loop antenna to be magnetically coupled with a wireless IC chip in a case where the wireless IC chip is located outside the loop antenna.

Next, a second embodiment of the present invention is shown in FIGS. 9 and 10. An antenna 92 forms a closed loop on a base sheet 91. FIG. 9 shows an example in which a wireless IC chip 93 is included in a loop-shaped coil 92A formed by the antenna 92 and FIG. 10 shows an example in which the wireless IC chip 93 is disposed outside the loop-shaped coil 92A formed by the antenna 92. In each drawing, a coil 93A of the wireless IC chip 93 and the coil 92A of the antenna 92 are magnetically coupled.

While only the coil 93A is shown on the surface of the wireless IC chip 93, the coil 93A is connected to a circuit element or a functional block, like in the wireless IC chip 11 shown in FIG. 1A.

Also in FIGS. 9 and 10, the wireless IC chip 93 is shown in an enlarged manner compared with the length of the line of the antenna 92. The actual length of the loop shape of the antenna 92 typically corresponds to the wavelength. The wireless IC chip 93 used in such a manner that it is fixed to the base sheet 91 such as paper typically 1 mm or less. The length of the antenna 92 is designed in accordance with the wavelength and is on the order of several tens of mm.

In the above-mentioned "coupling unit" having a function of coupling a chip and an antenna, in principle, if the coil 93A of the wireless IC chip 93 and a conductor of the coupling part of the antenna are close to each other in parallel, the two circuits are magnetically coupled. Such coupling causes a cross talk when designing the wiring of a integrated circuit and such a structure is a structure whose use should be avoided; however, the coil 93A and the conductor are positively brought close to each other in order to increase transmission electromagnetic energy and the lengths of the parallel parts are increased.

One of contact methods is a method of overlapping the spiral coil of the wireless IC chip and the antenna (antenna line) to be magnetically coupled with the spiral coil with each other rather than a method of including the wireless IC chip. In this case, the on-chip coil is insulated, for example, using a plasma silicon nitride film serving as a protection film; therefore, the on-chip coil and the coil of the coupling part of the antenna line are insulated from each other by the insulating film.

Figure 11:
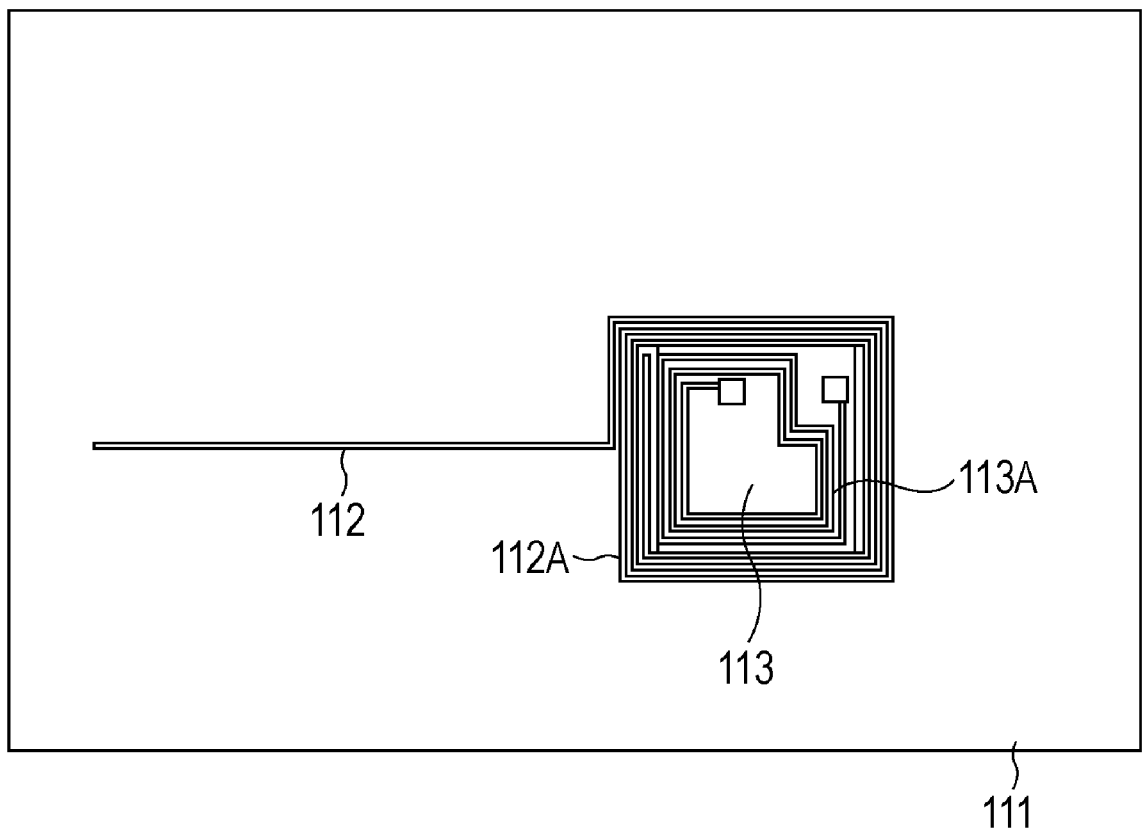
FIG. 11 is a disposition plan view of a wireless IC chip and a spiral monopole antenna.

Among methods for increasing the lengths of the parallel parts of the on-chip coil and the coil on the base sheet is a method of winding the antenna line serving as the coupling part coil in a spiral manner. This method is shown in FIG. 11. In FIG. 11, "111" represent a base sheet, "112" represents an antenna, "112A" represents a spirally wound, coupling part coil of the antenna, "113" represents a wireless IC chip, and "113A" represents an on-chip coil. The length of the coil 113A on the wireless IC chip 113 on the base sheet 111 is designed as appropriate depending on the frequency to be used and is wound spirally. In this case, the end of an internal line of the spiral coil 112A must be taken out of the spiral. Such configuration cannot be provided by simply using a single-layer antenna line is used. For this reason, the antenna 112 is formed in two layers.

Figure 12:
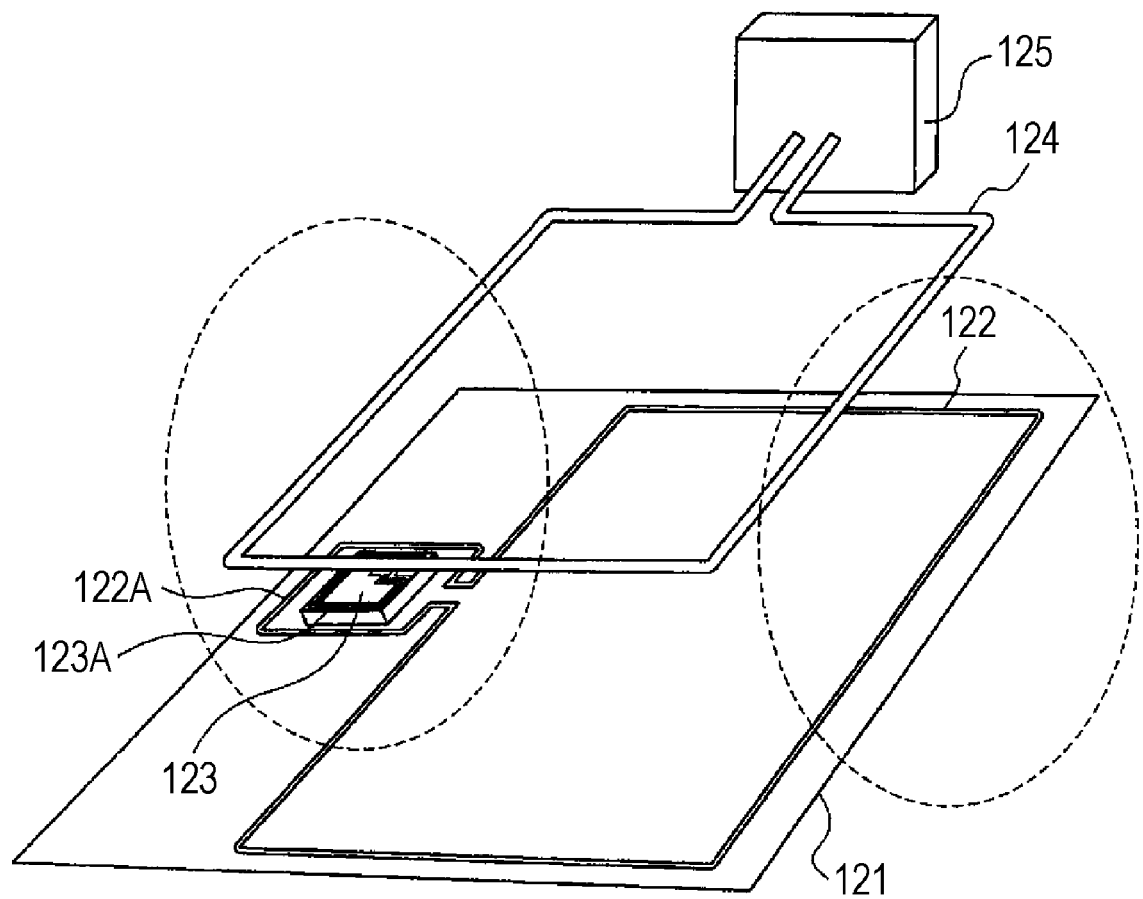
FIG. 12 is a perspective external view of a loop antenna of a reader/writer to be magnetically coupled with a loop antenna on a base sheet.

FIG. 12 shows a state in which an electromagnetic wave is transmitted from a loop antenna 124 for a reader/writer at a frequency of 2.45 GHz and the antenna 122 on a base sheet 121 receives this electromagnetic wave. A current having an identical frequency is induced in the antenna 122 and a coil 123A of a wireless IC chip 123 magnetically coupled with the antenna 122 receives this current. A power supply circuit of the wireless IC chip 123 for converting power generates and accumulates direct-current power necessary for an operation. Using this direct-current power, the wireless IC chip 123 transmits stored data from the on-chip coil 123A to the antenna 122 via the magnetic coupling. A reader/writer 125, which is put in readout mode, receives the data via the electromagnetic coupling between the antennas.

Next, assuming that the two antennas, that is, the antenna 122 of the reader/writer 125 and the antenna 124 of the base sheet 121 have an identical structure and an identical size, a transmission characteristic was obtained at a frequency near 2.4 GHz with the distance between the antennas changed using a simulation. As a result, the transmission loss was approximately the same and there was obtained a prospect that readout is possible even from a distance of 300 mm or so like in the case of the above-mentioned dipole antenna.

An operation example in which power is transmitted at the resonance frequency of the antenna has been heretofore described. However, power is transmitted from an external probe antenna having sufficient power. Therefore, the frequency does not need to be completely matched with the resonance frequency of the antenna 122 on the base sheet 121 coupled with the wireless IC chip 123.

Figure 13:
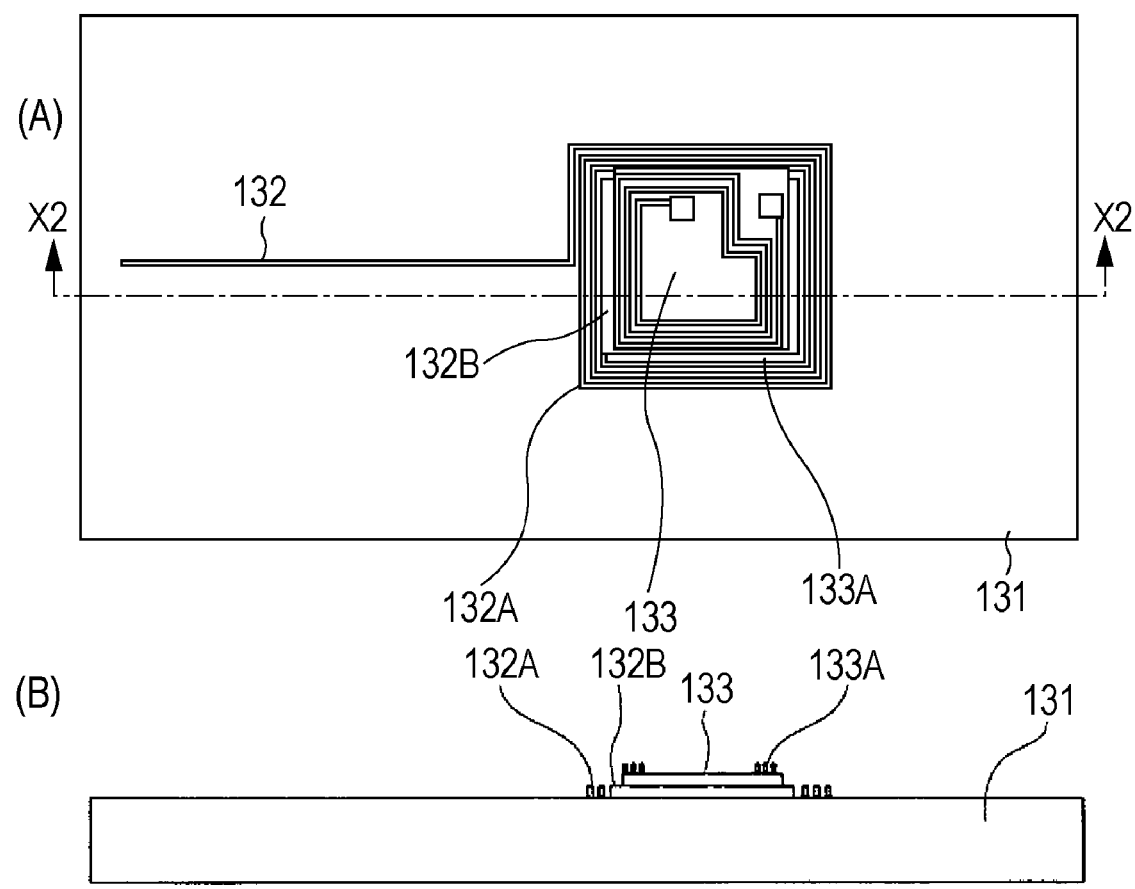
FIG. 13 includes a disposition plan view (A) of a monopole antenna, where which one surface of a wireless IC chip is connected to the inner end of a spiral of the monopole antenna, and a sectional view (B) taken along line X2-X2 of (A).

Referring now to FIG. 13, a third embodiment of the present invention will be described. The third embodiment is an example in which the coupling unit between a wireless IC chip and an antenna line is disposed at an end of the antenna line, the coupling part of the antenna line on a base sheet is a loop-shaped or spiral coil, and the wireless IC chip is disposed on a connection pad at the end of the antenna line. In FIG. 13, (A) is a plan view and (B) is a sectional view taken along line X2-X2 of (A). In the sectional view (B) of FIG. 13, the thickness of the base sheet is shown in an exaggerated manner. This applies to the following description of the embodiment. In (A) and (B) of FIG. 13, "131" represents a base sheet, "132" represents an antenna line, "132A" represents a spiral part (loop part) acting as the coupling part of the antenna line 132, "132B" represents a connection pad, "133" represents a wireless IC chip, "133A" represents a coil on the wireless IC chip 133. One surface of the wireless IC chip 133 is made of aluminum connected to a silicon substrate and fixed onto the connection pad 132B formed at the inner end of the spiral part 132A using a conductive adhesive (e.g., silver paste).

In this case, the antenna line is a one-fourth wavelength monopole antenna and is typically grounded via a coil connected to an end thereof. The coil of the antenna and the coil of the chip are used in a state in which these coils are connected to each other. Therefore, this method must connect one end of the antenna to the coil of the chip electrically. In this respect, this method has a problem similar to that of the related art.

Figure 14:
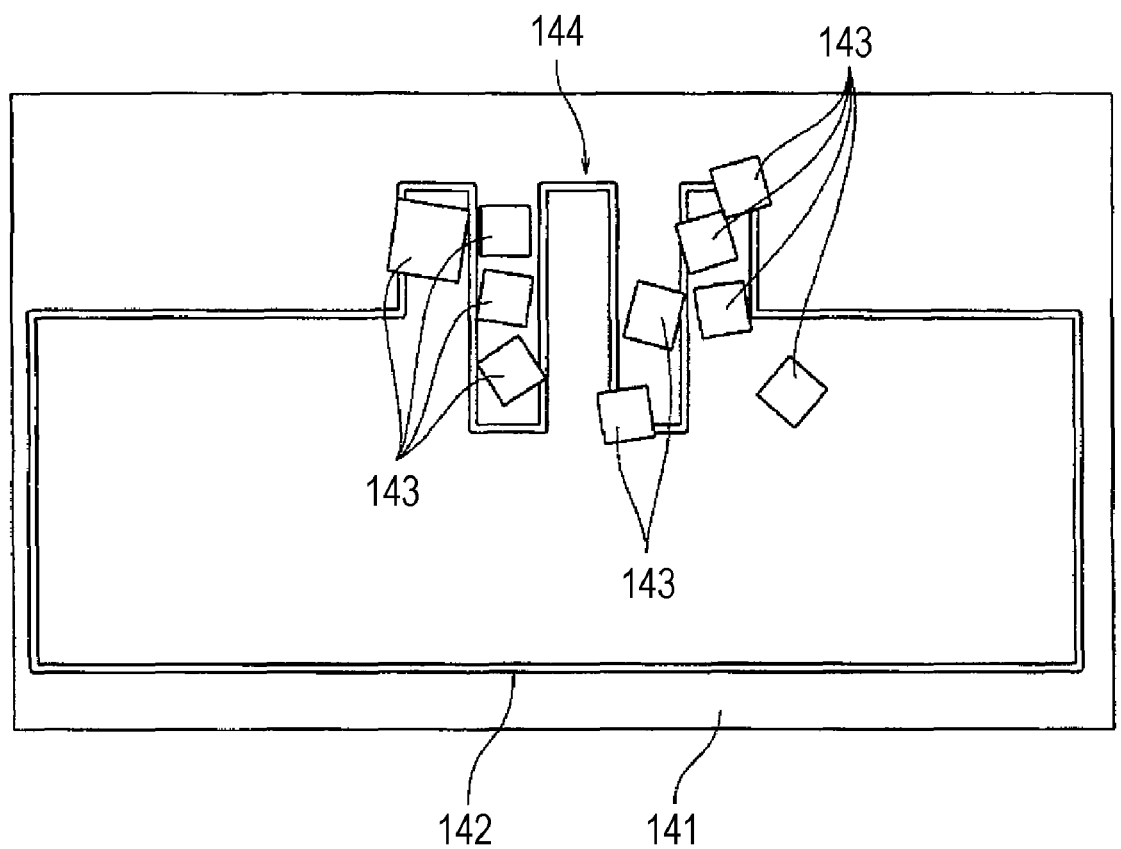
FIG. 14 is a plan view showing an example disposition of a meander antenna having multiple magnetic coupling parts and possible multiple chips.

An example having a configuration in which multiple coupling parts are formed on one antenna and multiple wireless IC chips are disposed is shown as a fourth embodiment of the present invention in FIG. 14, which is a disposition plan view. A loop-shaped antenna 142 formed on a base sheet 141 includes a meandering part (meander) 144. The meandering part 144 forms multiple coupling parts with multiple wireless IC chips 143 having different shapes. Among the wireless IC chips 143, example wireless IC chips that do not fit into the coupling part are also shown. The antenna 142 having the bent meandering part 144 as described above is called a "meander antenna."

Among the wireless IC chips 143, example wireless IC chips straddling the meander antenna 142 are also shown. If the antenna line is disposed in such a manner that the antenna line cuts across the center of a wireless IC chip, a magnetic field having a reverse direction cuts across the wireless IC chip. As a result, magnetic coupling is not substantially obtained. Such a state occurs if many wireless IC chips are used in a powder manner in which the wireless IC chips are not controlled individually. However, there is a high probability that the wireless IC chips are always disposed in positions in which the wireless IC chips are magnetically coupled with the antenna line. Therefore, the wireless IC chips are used ignoring a case where magnetic coupling does not occur.

If two antennas through which currents are passing in opposite directions cut across wireless IC chips, magnetic coupling does not occur. This is avoided by making an adjustment in the design process or manufacturing process.

While the meandering part 144 of the meander antenna 142 is drawn with the bending cycle (or pitch) kept constant in FIG. 14, the pitch of the meandering part 144 may vary depending on locations in accordance with the application.

By adopting the above-mentioned configuration according to the present invention, minute chips and an antenna that is allowed to transmit electromagnetic energy are coupled stably while making an allowance.

While the structures and configurations of the coupling part/coupling unit and antenna according to the first to fourth embodiments of the present invention have heretofore been described, any of these structures and configurations are examples of basic shapes. The coupling part coil of the antenna (14A in FIGS. 1A and 92A, 112A, 122A, 233A, etc. corresponding to 14A) may be any of a single-turn coil, a spiral coil, and a helical coil, whose conductors are disposed on and below a single-layer substrate or a multilayered substrate. Also, even if the coupling part coil of the antenna line to be coupled with the on-chip coil is wound in the form of a square, a circle, an ellipse, or a polygon, the object of being coupled with the on-chip coil as a component of the coupling unit is achieved as well. These modifications are included in the technical idea of the present invention.

The same thing applies to the coil on the wireless IC chip (13A in FIGS. 1A and 93A, 113A, 123A, 133A, etc. corresponding to 13A) in the first to fourth embodiments. That is, the on-chip coil may be any of a single-turn coil, a spiral coil, and a helical coil. Also, the on-chip coil may take any shape such a square, a circle, an ellipse, or a polygon. These modifications are included in the technical idea of the present invention.

Also, as for the antenna, the liner dipole antenna, monopole antenna, and square loop antenna have been described in the first to fourth embodiments; however, these antennas are illustrative only. Even if the shape of the antenna is a line, a wave, a meander, a square, a rhombus, or other polygons, the antenna is included in the technical idea of the present invention.

It has been somewhat mentioned that even if the above-mentioned wireless IC chip and coupling part of the antenna are slightly displaced from each other without completely overlapping each other, magnetic coupling is not significantly hampered. This point will be described again with reference to FIG. 15 and the above-mentioned example shown in FIG. 13.

Figure 15:
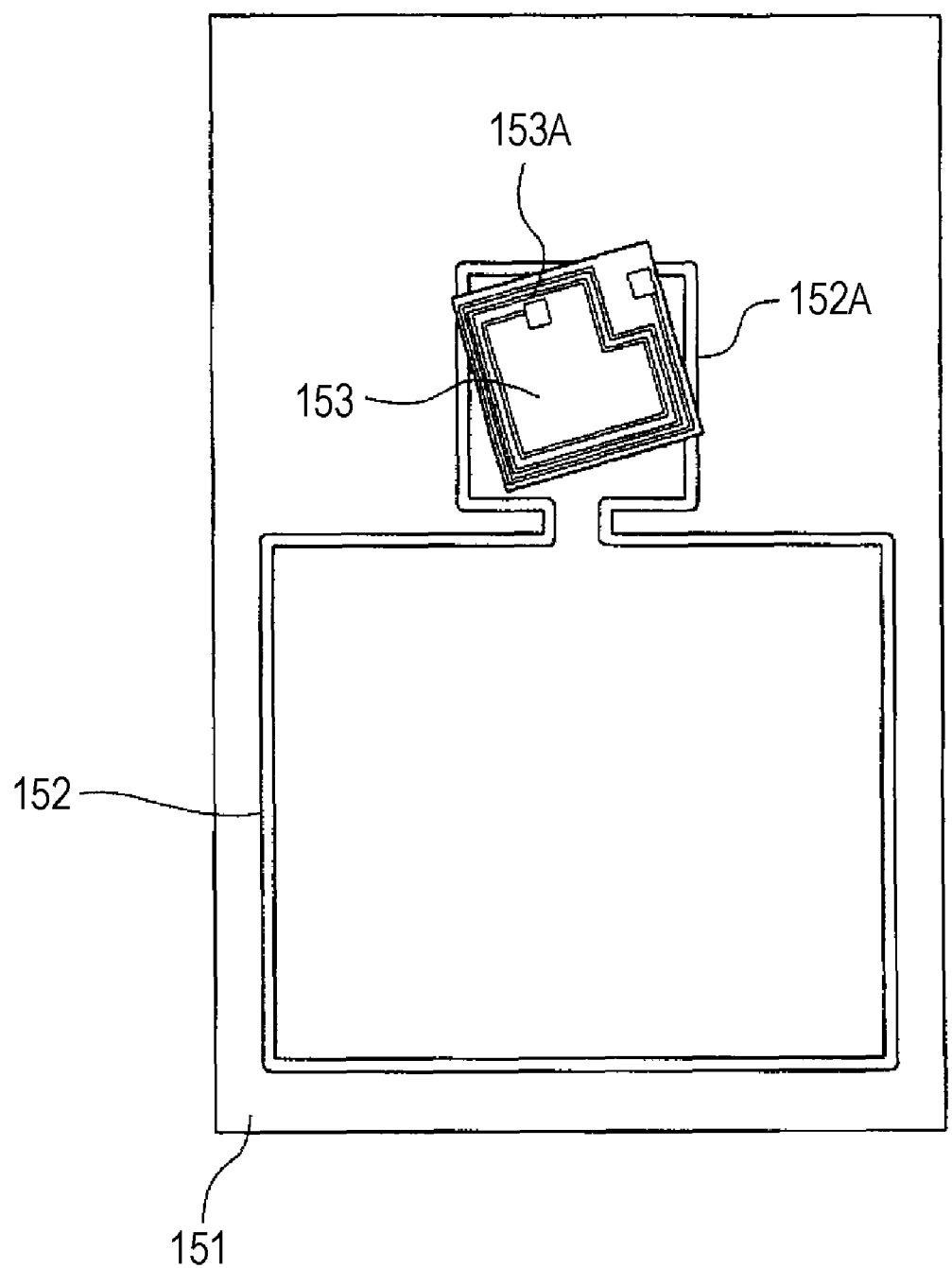
FIG. 15 is a disposition plan view of a loop antenna where a wireless IC chip overlaps the loop antenna.

FIG. 15 is an example using a loop antenna. FIG. 15 shows magnetic coupling between a wireless IC chip 153, which is a typical wireless IC chip according to the present invention, and a coil (coupling part) 152A of a loop-shaped antenna 152 on a base sheet 151. A spiral coil 153A is formed on the wireless IC chip 153. Although the wireless IC chip 153 somewhat extends off the coil 152A in this drawing, the magnetic coupling therebetween is not significantly affected.

Also, the above-mentioned example shown in FIG. 13 is an example using a monopole antenna. While the wireless IC chip 133 somewhat extends off the center of the coupling part toward an upper part of the drawing, the magnetic coupling therebetween is not significantly affected as well.

While paper is used as the material of the base sheet 12 and the like in the first to fourth embodiments, the material may be a material other than paper, such as a plastic or a material having characteristics similar to those of a plastic, as long as the material is a non-conductive material on a sheet.

Also, the thickness of the base sheet 12 and the like may be, for example, the thickness of a card or so, which is not so thin as a sheet. In the above-mentioned example shown in (B) of FIG. 13, the base sheet 131 takes the shape of a card, which has a certain level of thickness.

Also, the first to fourth embodiments all have a configuration in which a wireless IC chip and a coil (coupling part) of an antenna are disposed on a base sheet and a coil of the wireless IC chip is disposed above the coil of the antenna. Modifications of such a configuration will be described with reference to FIGS. 16A to 16J.

Figure 16A:
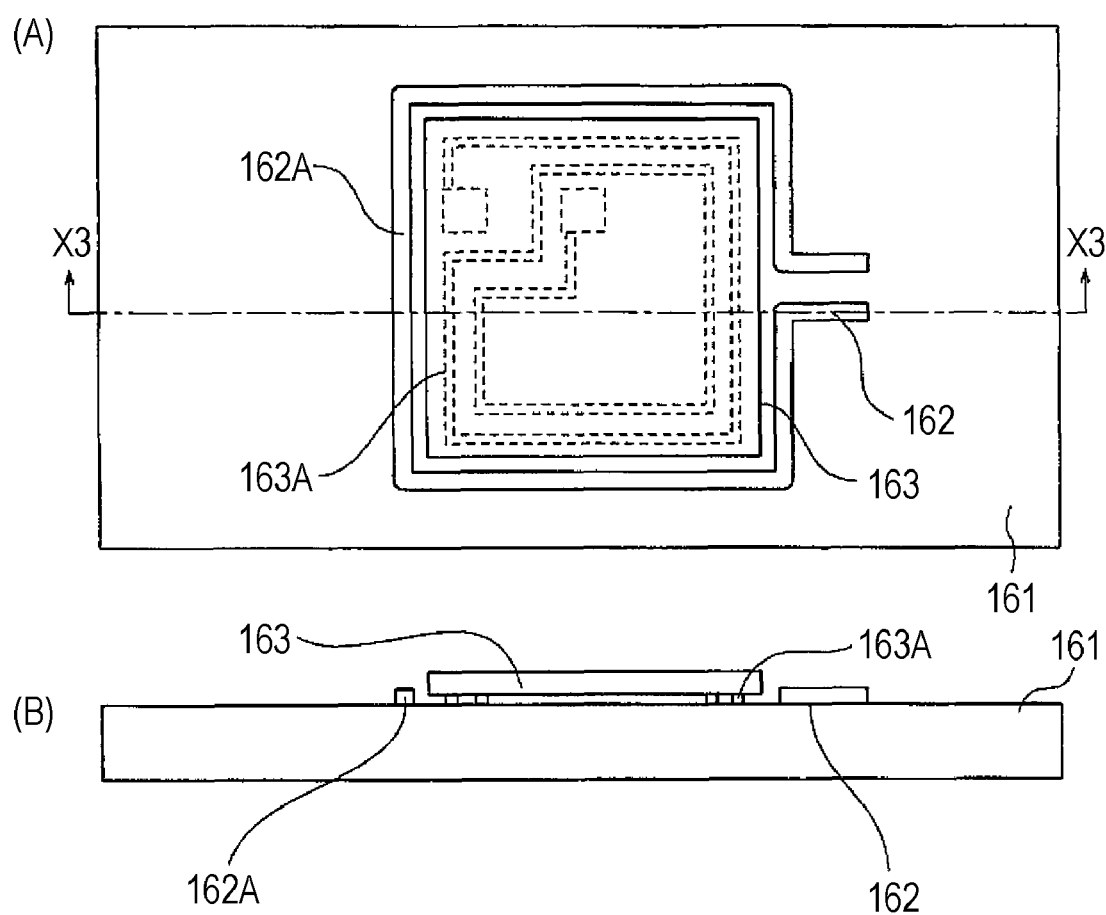
FIG. 16A includes a plan view (A) of a coupling unit in a case where a wireless IC chip is vertically reversed and a sectional view (B) taken along line X3-X3 of (A).

First, while a wireless IC chip and an on-sheet coil (coupling part) are disposed on an identical surface of a base sheet in the above-mentioned embodiments, the function of the coupling unit is fully realized even if the wireless IC chip is vertically reversed, as shown by a wireless IC chip 163 in FIG. 16A. In the description of the following modifications, a case where the wireless IC chip 163 is vertically reversed will be included. In (A) and (B) of FIG. 16, "161" represents a base sheet, "162" represents a coupling part-drawing part, which is a part of an antenna, "162A" represents a coil (coupling part) of the antenna 162, and "163A" represents a spiral coil on the wireless IC chip 163. In (A) of FIG. 16, the length of one side of the square wireless IC chip 163 is, for example, 450 μm and the length of one side of the square coil 162a is, for example, 550 μm.

Figure 16B:
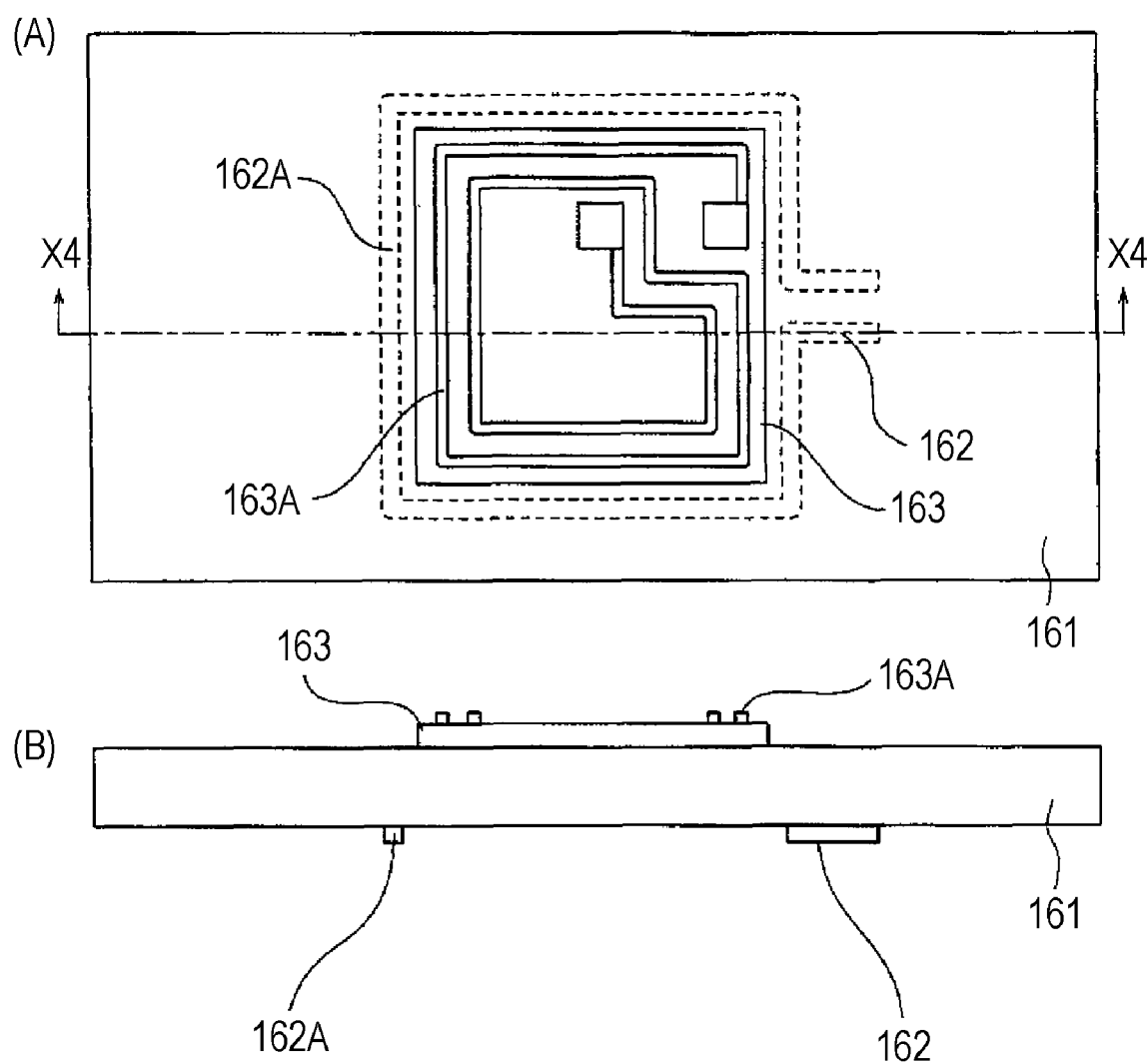
FIG. 16B includes a plan view (A) of a coupling unit in a case where a wireless IC chip is disposed on a side of a base sheet other than a side thereof on which an antenna coupling part is disposed and a sectional view (B) taken along line X4-X4 of (A).

Even if the coil 163A of the wireless IC chip 163 and the coil (coupling part) 162A of the antenna 162 are disposed on opposed sides of the base sheet 161 as shown in FIG. 16B, the function of the coupling unit is sufficiently performed. However, in this case, the thickness of the base sheet 161 determines the distance between the coil 163A of the wireless IC chip 163 and the coil (coupling part) 162A. Therefore, the base sheet 161 having a thickness such that coupling is sufficiently ensured must be used as a matter of course.

Figure 16C:
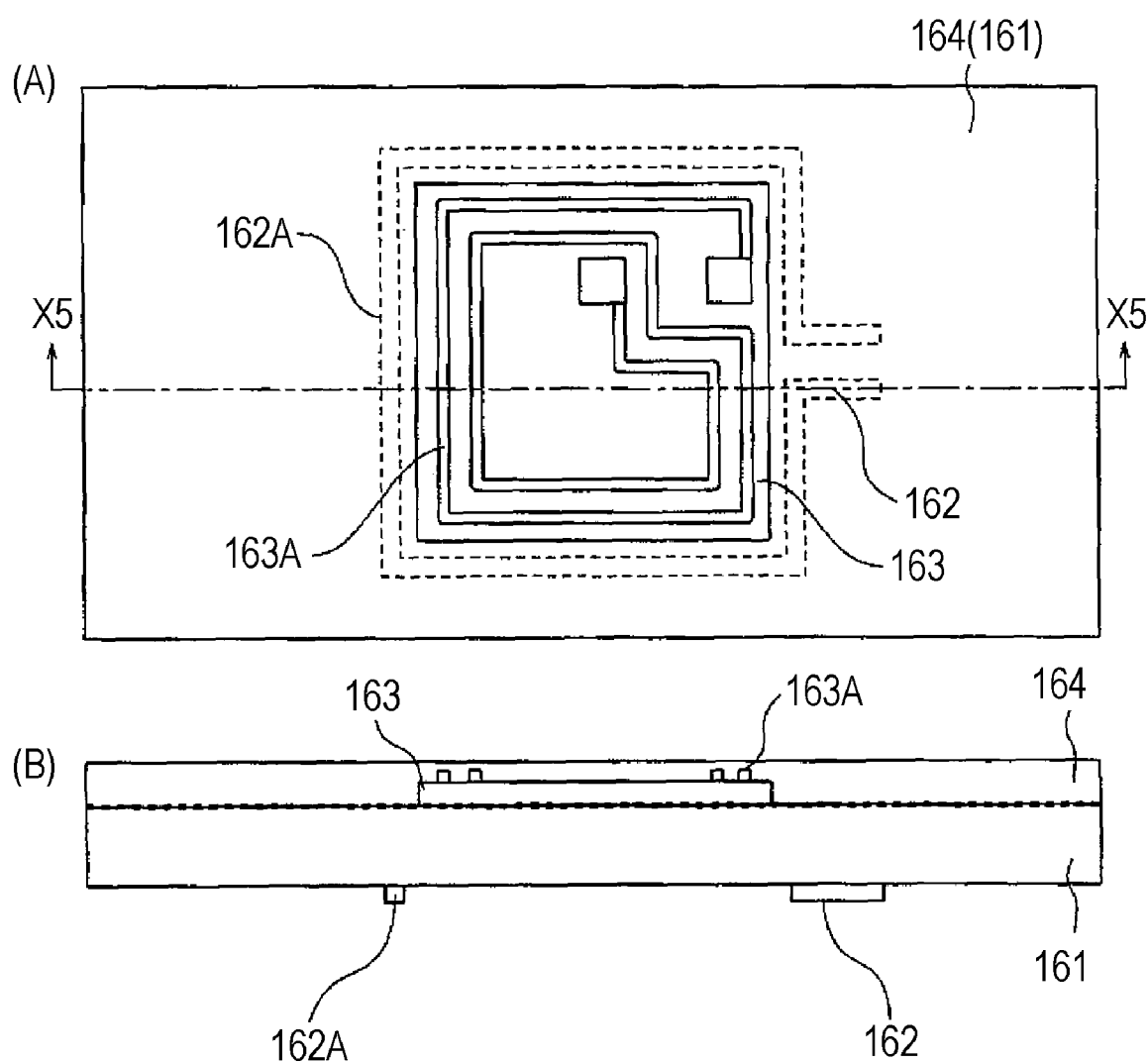
FIG. 16C includes a plan view (A) of a coupling unit in a case where a wireless IC chip is interposed between or embedded in a base sheet and a sheet and a sectional view (B) taken along line X5-X5 of (A).
Figure 16D:
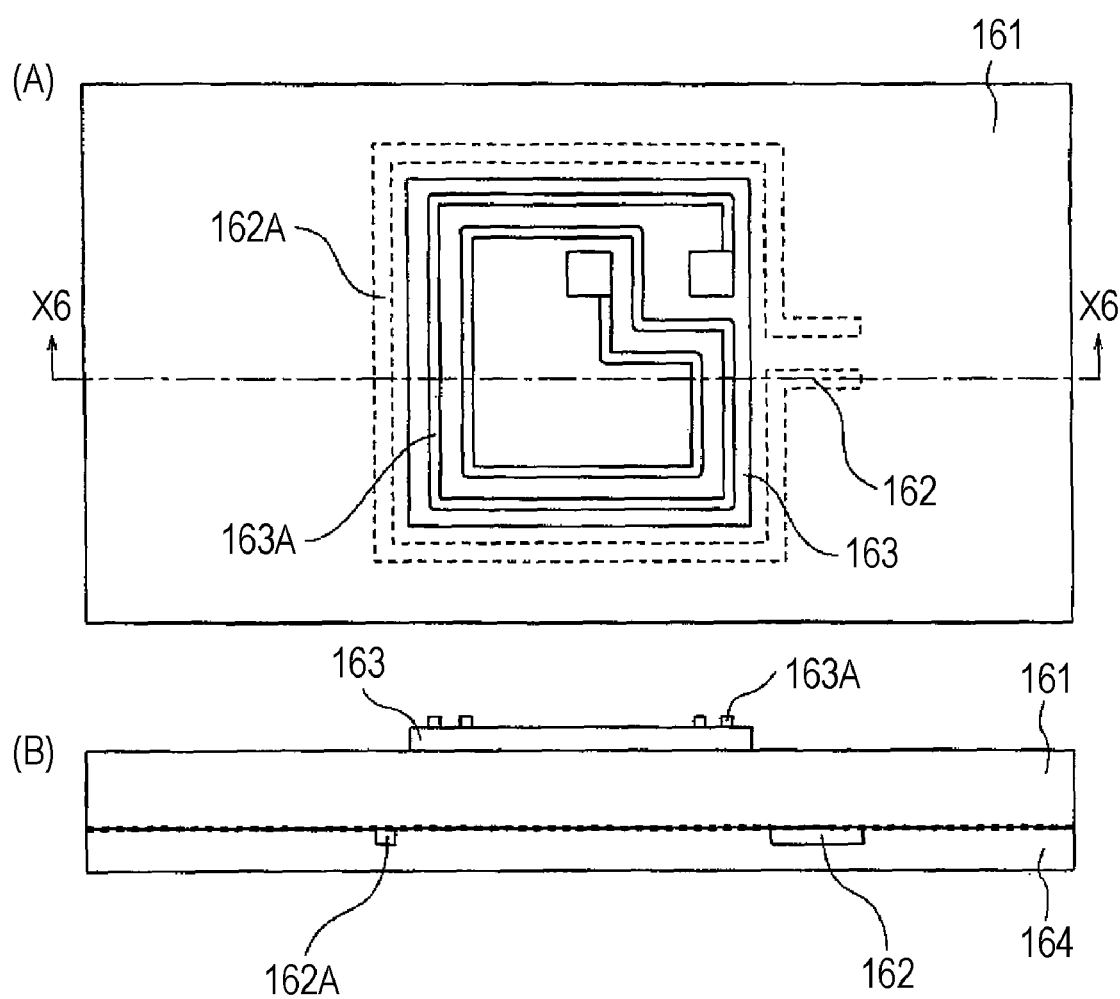
FIG. 16D includes a plan view (A) of a coupling unit in a case where an antenna coupling part is interposed between or embedded in a base sheet and a sheet and a sectional view (B) taken along line X6-X6 of (A).

Also, as shown in FIG. 16C, the wireless IC chip 163 may be interposed between the base sheet 161 and a sheet 164 located above the base sheet 161 and the coil (coupling part) 162A of the antenna 162 may be disposed on an outer surface of the base sheet 161 or sheet 164. In contrast, the antenna 162 and the coil (coupling part) 162A thereof may be interposed between the base sheet 161 and the sheet 164 located below the base sheet 161 and the wireless IC chip 163 may be disposed in a position on the base sheet 161 or the sheet 164 and near the coil (coupling part) 162A (FIG. 16D).

The above-mentioned cases include a case where when making paper, the wireless IC chip 163 and the antenna 162 and the coil (coupling part) 162A thereof are made in the paper. For this reason, such a case is shown by indicating the boundary between the base sheet 161 and sheet 164 in FIGS. 16C, 16D, 16E, 16F, and the like using a dotted line.

Also, like in the above-mentioned modification, the antenna 162 and the coil (coupling part) 162A thereof may also be disposed on the base sheet 161 on which the wireless IC chip 163 is disposed and the antenna 162 and the coil (coupling part) 162A may be covered with the sheet 164, which is another sheet. Also in FIG. 16C or FIG. 16D, like in FIG. 16B, the thickness of the base sheet 161 or sheet 164 must be a thickness such that coupling is sufficiently ensured or less than the thickness.

Figure 16E:
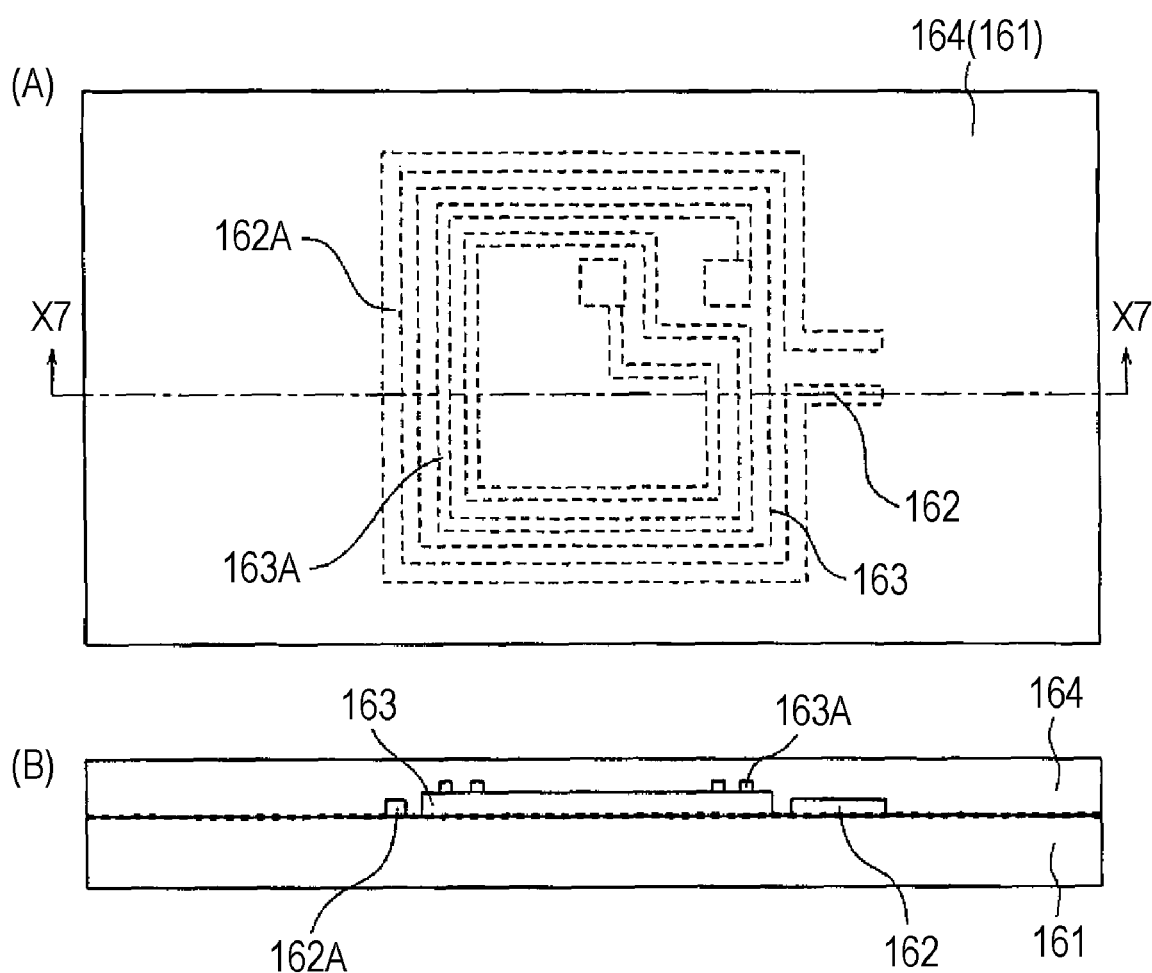
FIG. 16E includes a plan view (A) of a coupling unit in a case where a wireless IC chip and an antenna coupling part are interposed between or embedded in a base sheet and a sheet and a sectional view (B) taken along line X7-X7 of (A).

As shown in FIG. 16E, the wireless IC chip 163 and antenna 162 and the coil (coupling part) 162A thereof may be disposed on an identical surface of the base sheet 161 and these components may be covered with the sheet 164 so that the base sheet 161 and sheet 164 are bonded together.

Figure 16F:
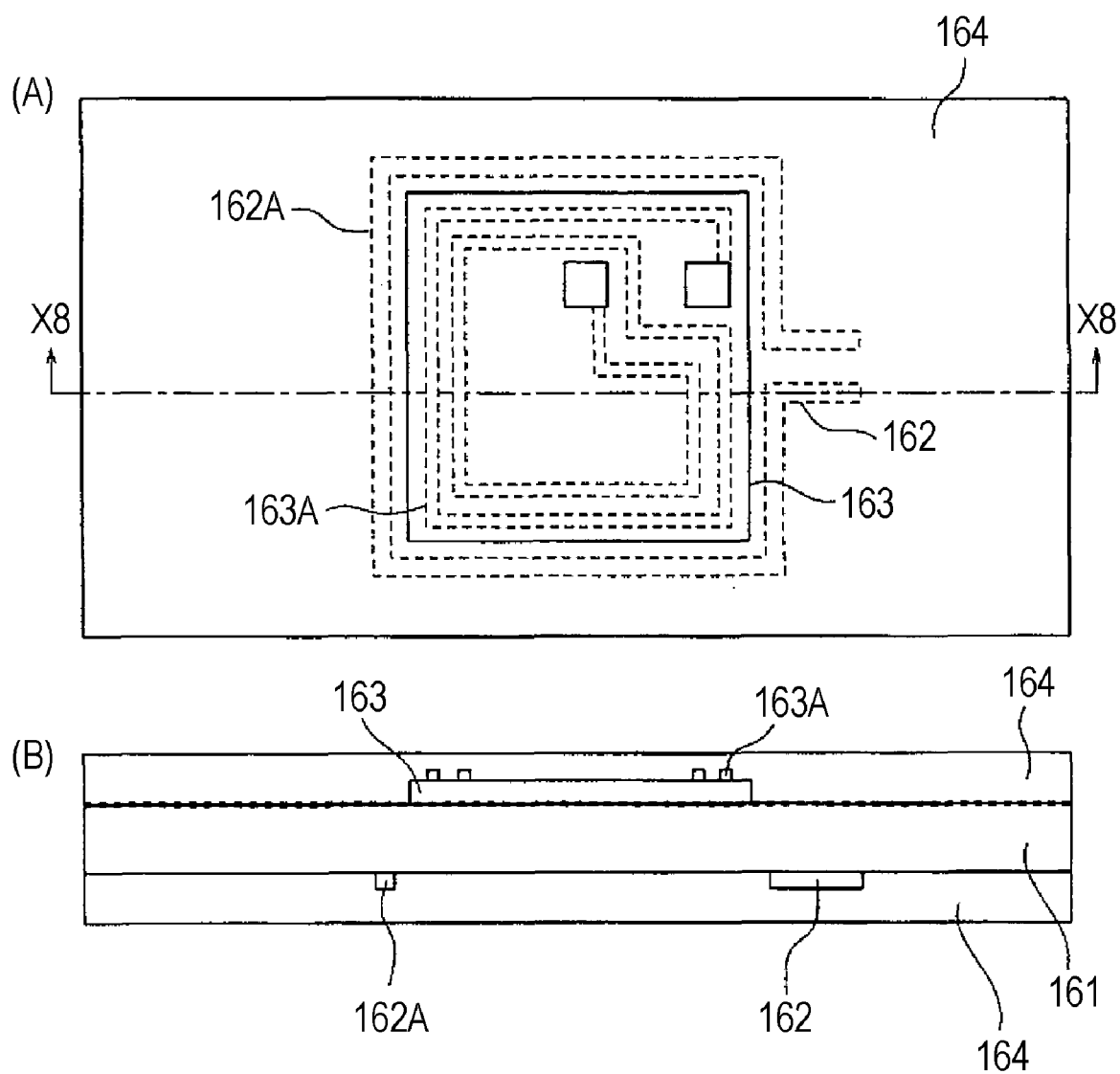
FIG. 16F includes a plan view (A) of a coupling unit in a case where a wireless IC chip and an antenna coupling part are interposed between or embedded in a base sheet and two sheets and a sectional view (B) taken along line X8-X8 of (A).
Figure 16G:
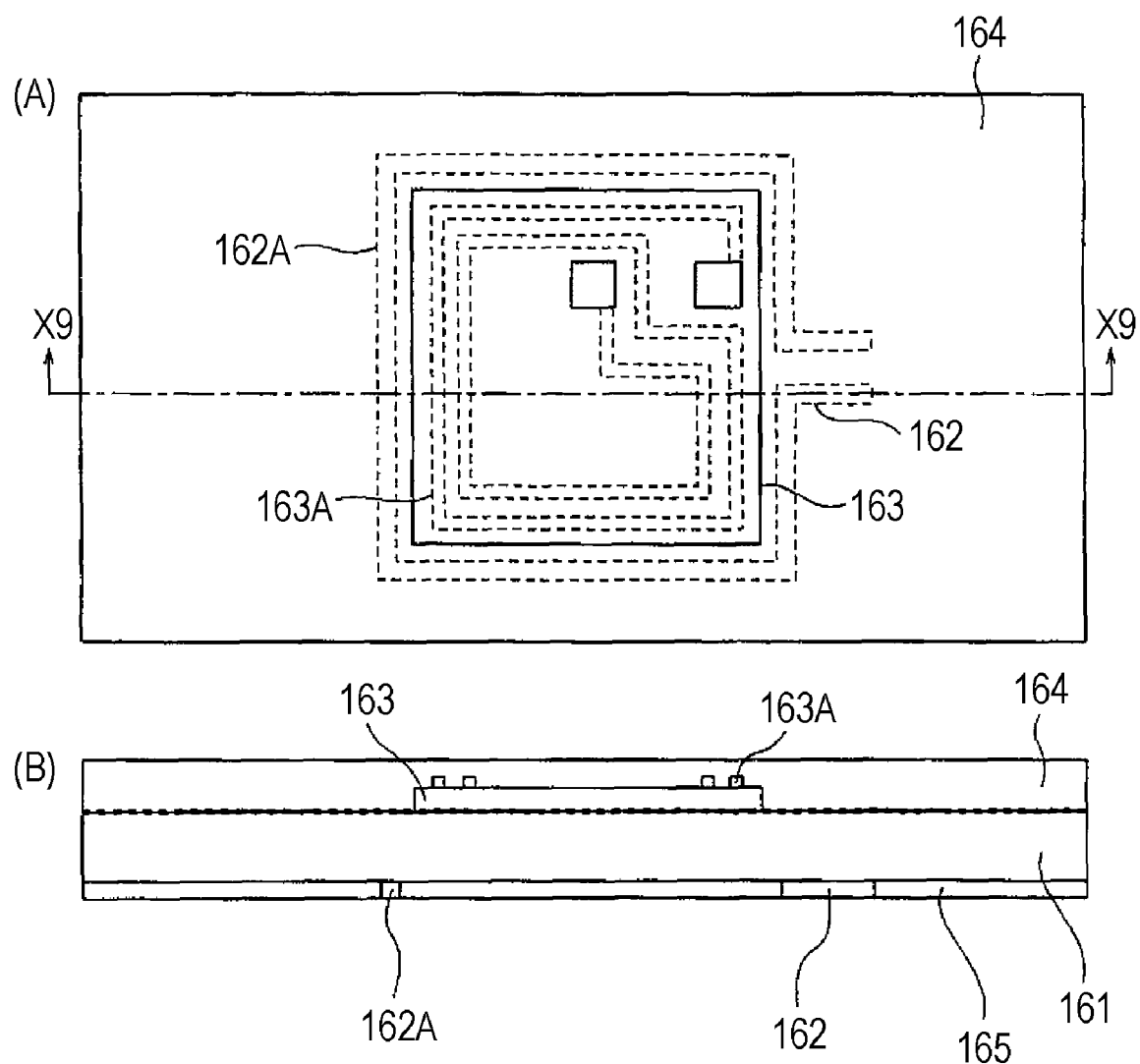
FIG. 16G includes a plan view (A) of a coupling unit in a case where a wireless IC chip is interposed between or embedded in a base sheet and a sheet and a coating is applied to an antenna coupling part, and a sectional view (B) taken along line X9-X9 of (A).
Figure 16H:
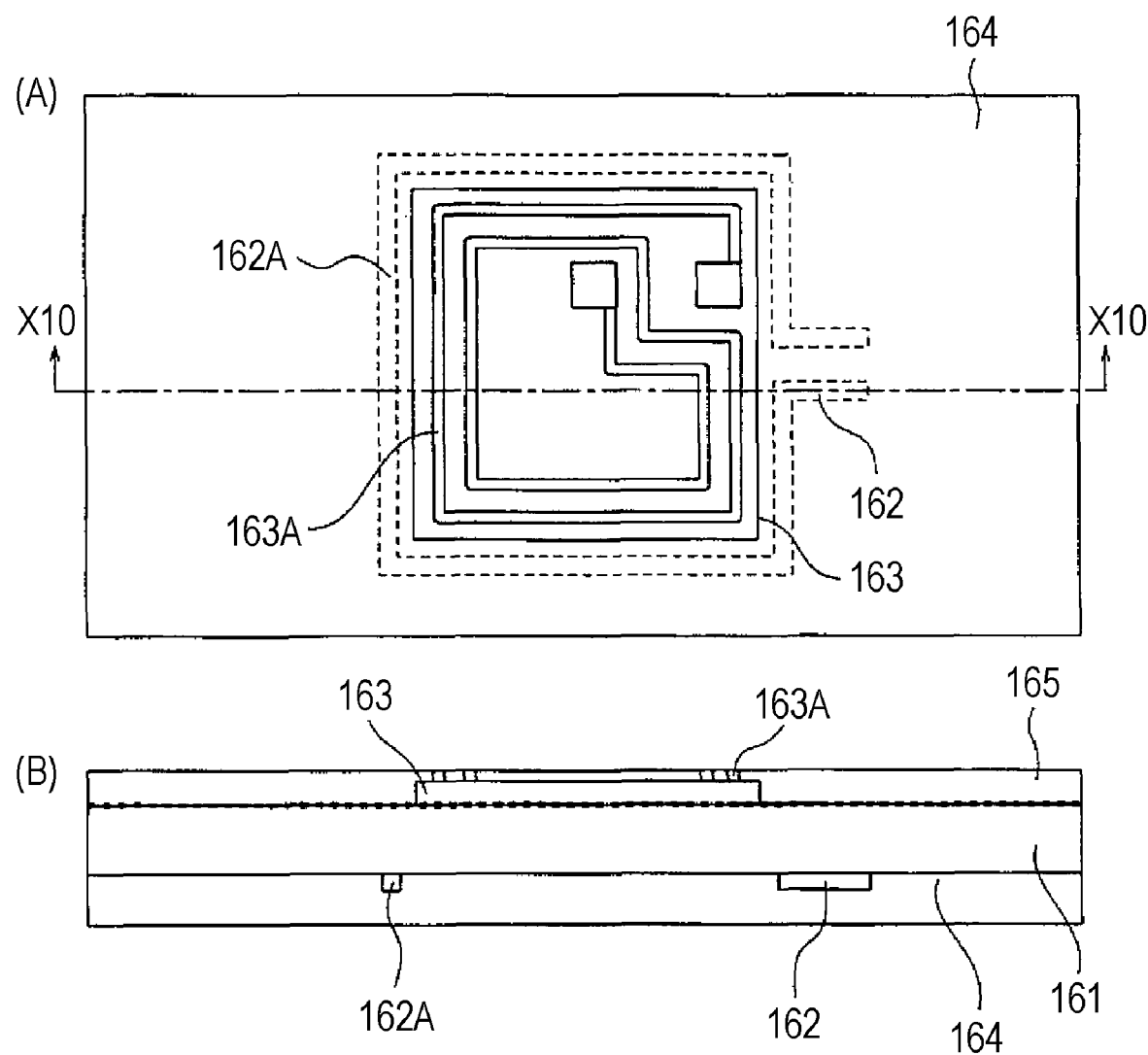
FIG. 16H includes a plan view (A) of a coupling unit in a case where an antenna coupling part is interposed between or embedded in a base sheet and a sheet and a coating is applied to a chip, and a sectional view (B) taken along line X10-X10 of (A).
Figure 16I:
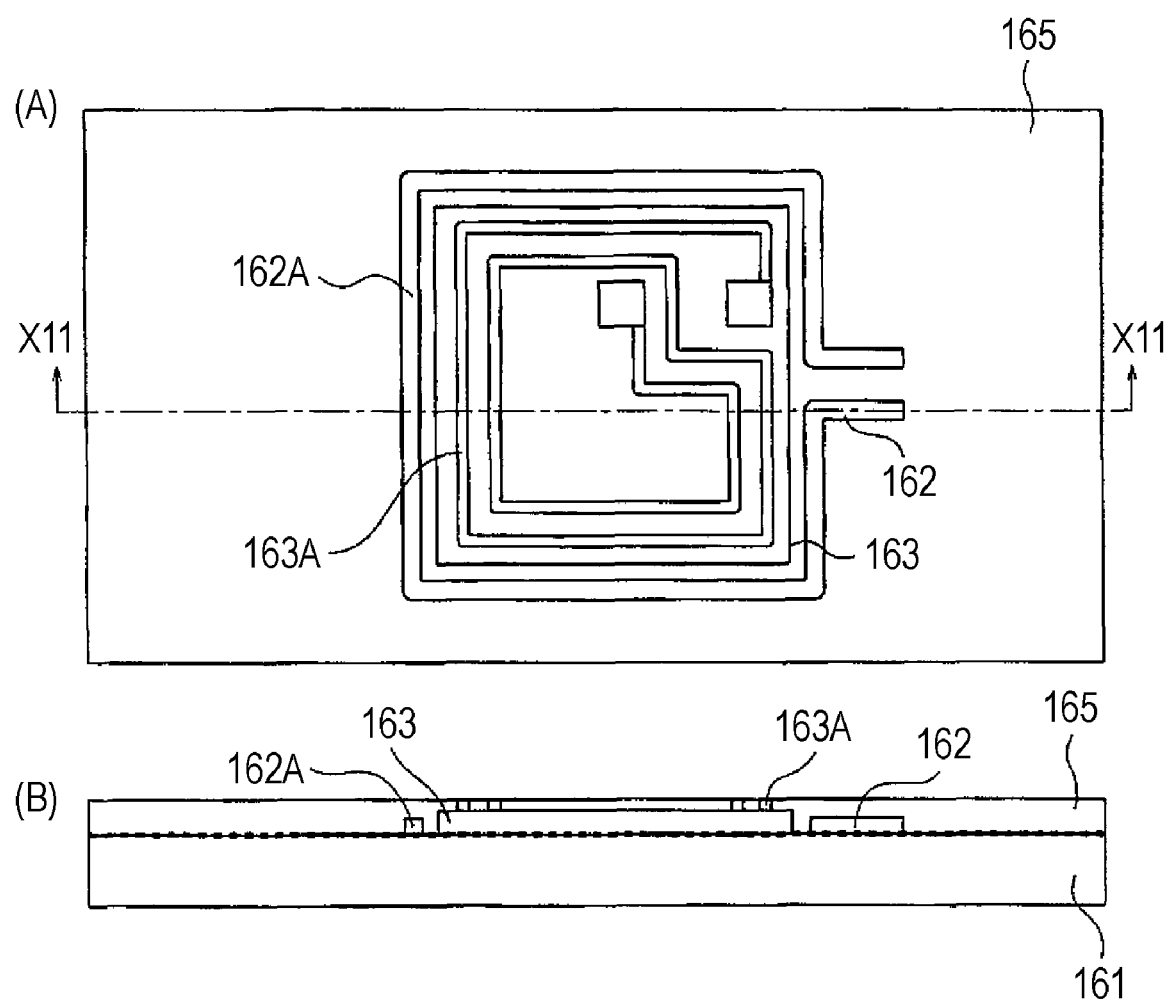
FIG. 16I includes a plan view (A) of a coupling unit in a case where a coating is applied to a wireless IC chip and an antenna coupling part on a base sheet, and a sectional view (B) taken along line X11-X11 of (A).
Figure 16J:
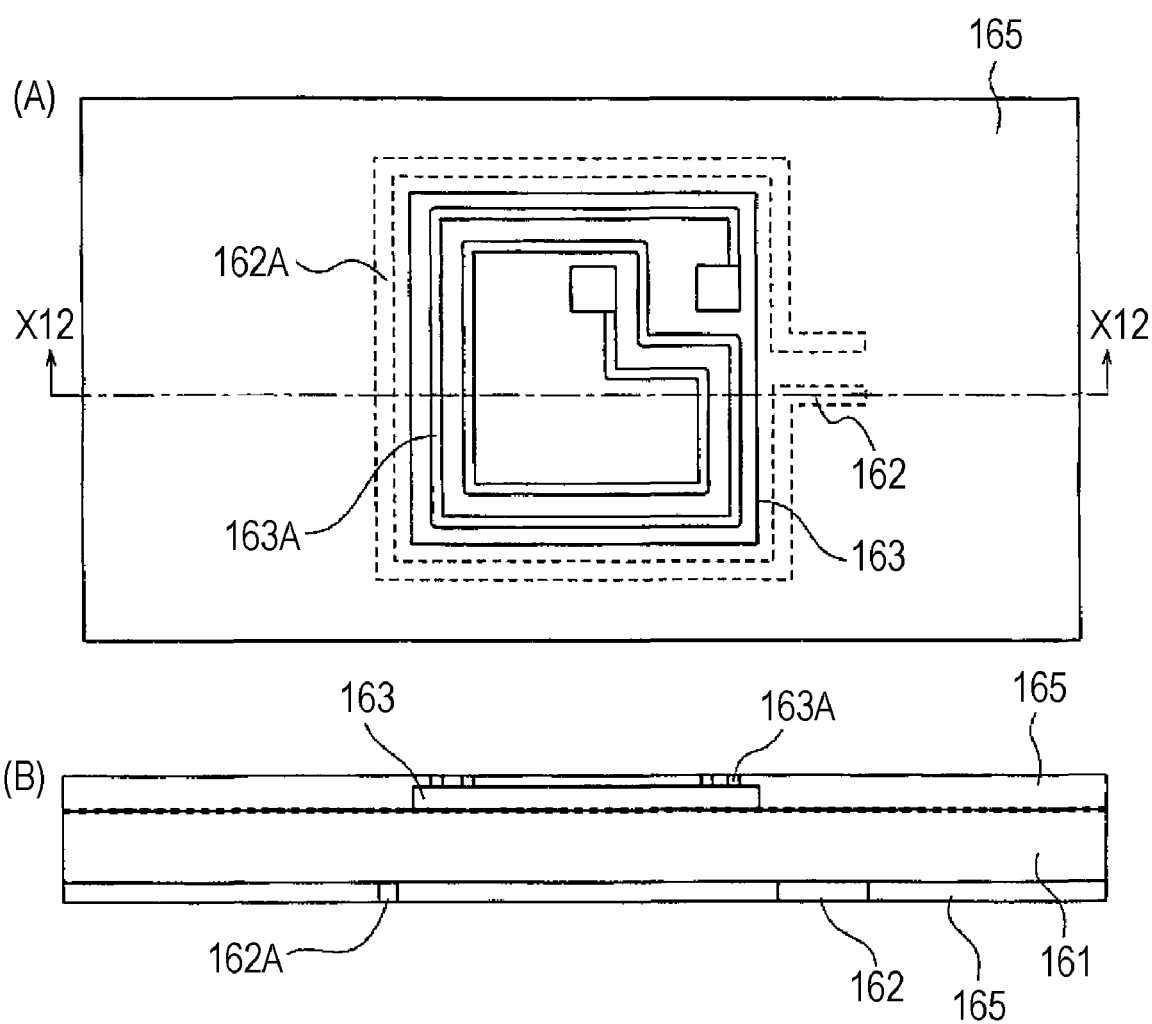
FIG. 16J includes a plan view (A) of a coupling unit in a case where a wireless IC chip and an antenna coupling part are disposed on opposed sides of a base sheet and a coating is applied to the wireless IC chip and antenna coupling part, and a sectional view (B) taken along line X12-X12 of (A).

Also, as shown in FIG. 16F, the wireless IC chip 163 and the antenna 162 and the coil (coupling part) 162A may be disposed on different surfaces of the base sheet 1161, that is, on the upper and lower surfaces thereof and may be covered with the sheets 164.

The modifications described with reference to FIGS. 16A to 16F are typical modifications of the first to fourth embodiments. Further, there are cases in which, in these modifications, the wireless IC chip 163 or the antenna 162 and the coil (coupling part) 162A disposed on the upper surface or lower surface of the base sheet 161 may be coated with print ink 165 or the like. Examples of such a case are shown in FIG. 16G, 16H, 16I, or 16J. While the coating ink and a surface of the antenna or on-chip coil are matched with each other in the above-mentioned FIGS. 16G, 16H, 16I, and 16J, there occurs a case where, depending on the viscosity of the ink, the ink rises and the surface of the antenna or on-chip coil is finished in such a manner that the surface is covered with the rising ink.

The layer structure of the antenna, coil (coupling part) thereof, wireless IC chip, sheet for protecting these elements, and base sheet has heretofore been described. Also, there are convenient methods for manufacturing these elements. Since these elements do not need to be physically brought into contact with each other so that these elements are coupled, it is possible to use a method of previously bonding parts of an antenna and a wireless IC chip to sheets using an adhesive and continuously bonding the sheets together after positioning the sheets. Also, the bonded sheets may be reeled up like a belt and provided as a roll. If a base sheet or a sheet is made of a thermosetting resin, rigidity can be given to the base sheet or sheet later. An antenna may be made by printing using metal fine powder. Printing may be any of letterpress printing and copperplate printing. Also, offset printing may be performed by ink type.

If the size of a chip is reduced, e.g., to 0.15 mm or so, it is difficult to select and pick up such a chip. In this case, for example, a magnetic material may be previously attached to one surface of the chip and the chip may be picked up using a magneto while selecting the top-bottom relation of the chip.

While the coupling unit in which one or more wireless IC chips and one antenna are coupled has been described in the first to fourth embodiments and the modifications thereof, one or more wireless IC chips and multiple antennas may be coupled, that is, multiple antenna coupling parts may be provided.

Figure 17:
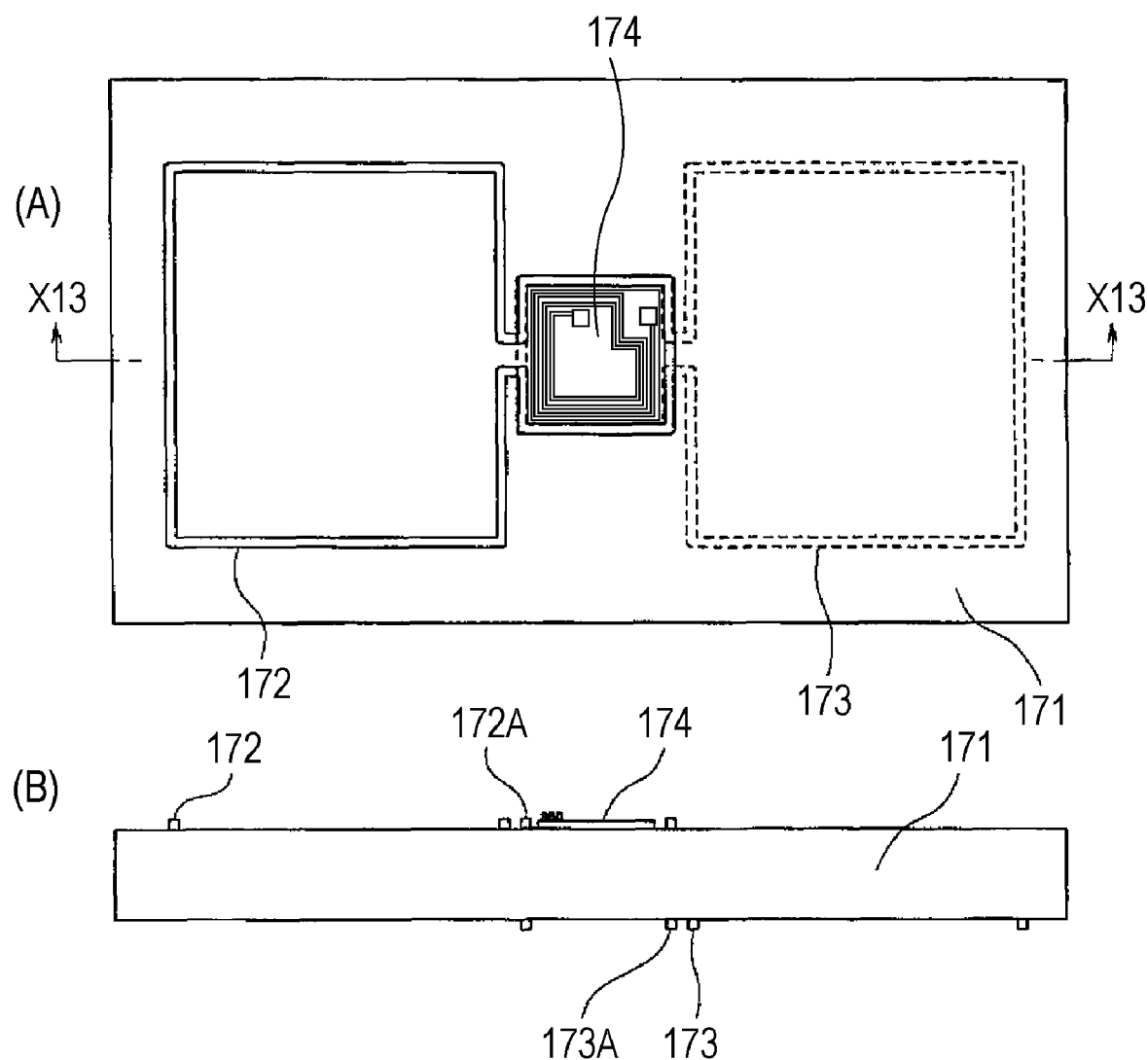
FIG. 17 includes a plan view (A) of a sheet in which loop antennas to be magnetically coupled with one wireless IC chip are disposed in two layers, that is, upper and lower layers, and a sectional view (B) taken along line X13-X13 of (A).

As an example, a case of a loop antenna is shown in FIG. 17. In FIG. 17, (A) is a plan view and (B) is a sectional view taken along line X13-X13. In (A) and (B) of FIG. 17, "171" represents a base sheet, "172" and "173" represent loop-shaped antennas, and "174" represents a wireless IC chip. The antennas 172 and 173 include coils 172A and 173A, respectively. The loop-shaped antennas 172 and 173 are disposed on the upper surface of the base sheet 171 and lower surface thereof, respectively, in such a manner that these antennas do not overlap each other vertically in an identical position. Thus, the area of the base sheet 171 is effectively used.

The technical idea of disposing two antennas on front and back surfaces (two layers) of a base sheet also allows disposing two or more antennas on a multilayered base sheet including three or more layers and coupling the antennas with one chip, as a matter of course. Accordingly, such a case falls within the technical idea according to the present invention.

Also, if linear antennas (dipole-type/monopole-type) are used, the linear antennas may be freely designed so that the upper antenna and the lower antenna are rotated by 90 degrees and thus intersect each other. Also, in order for an antenna line to obtain a designed length within a limited area, the antenna line may be designed so that the antenna is bent. Also, in order for an antenna to match the reception frequency, the shape of the antenna may be designed so that an appropriate capacitance component is generated.

The present invention has been described in detail using the embodiments. In any embodiment, there is obtained an advantage that a wireless IC chip and an antenna are coupled via a magnetic field/magnetic flux generated by the coils/loops thereof. Also, the embodiments and modifications of the present invention are categorized by: (1) the shape and structure of the antenna; (2) the shape and structure of a coil on a wireless IC chip; (3) the shape and structure of a coupling part of the antenna coupled with the coil of the wireless IC chip; and (4) a multilayered base sheet used in such a manner that the antenna and coupling part are disposed on both surfaces of the multilayered base sheet. However, various forms other than the embodiments described with respect to each category are conceivable and are all included in the technical idea of the present invention.

There is a strong industrial demand to use RFIDs at low-cost. While it is preferable to miniaturize semiconductor chips so as to meet the demand, it has been difficult to physically connect such a chip and an antenna for RF transmission due to a limitation in terms of reliability. It has been said that if the size of a chip is reduced to 150 μm or less, the chip is not destroyed even on a base (sheet) that can be bent like paper and that if both a minute chip and RF transmission are realized, the RFID market is expanded. The present invention realizes this. Also, the disposition of a chip and an antenna, which are to be magnetically coupled, on a sheet can be used to prevent bank notes and the like from being counterfeited.

The invention claimed is:

1. A base sheet comprising:
 a plurality of chips wherein each chip comprises a spiral or helical coil having at least one turn disposed on a surface of the chip, or inside the chip and near the surface; and
 an antenna line including a conductor orbiting around the coil of the chip or directly above or directly below the coil, wherein the conductor is magnetically coupled with the coil;
 wherein:
  the chip comprises a semiconductor circuit configured to store wirelessly readable information;
  the coil and the semiconductor circuit are electrically coupled to each other;
  the conductor of the antenna line is meandering and is magnetically coupled with the coil; and
  each chip of the plurality of the chips is configured to be magnetically coupled with the antenna line.

2. The base sheet according to claim 1, wherein the antenna line is a dipole antenna.

3. The base sheet according to claim 1, wherein the antenna line is a loop antenna.

4. The base sheet according to claim 1, wherein a plurality of the antenna line are formed in layers of a multilayered structure.

* * * * *

UNITED STATES PATENT AND TRADEMARK OFFICE
CERTIFICATE OF CORRECTION

| | |
|---|---|
| PATENT NO. | : 8,237,622 B2 |
| APPLICATION NO. | : 12/521244 |
| DATED | : August 7, 2012 |
| INVENTOR(S) | : Furumura et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Eighteenth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,237,622 B2  Page 1 of 1
APPLICATION NO. : 12/521244
DATED : August 7, 2012
INVENTOR(S) : Yuji Furumura et al.

It is certified that error appears in the above-identified patent and that said Letters Patent is hereby corrected as shown below:

On the Title Page, in Column 1, item (75), under "Inventors", on Line 2, delete "Tokyo (JP);" and insert -- Chiyoda, Tokyo (JP); --, therefor.

Signed and Sealed this
Sixteenth Day of September, 2014

Michelle K. Lee
*Deputy Director of the United States Patent and Trademark Office*